US 12,108,336 B2

(12) United States Patent
Ly et al.

(10) Patent No.: US 12,108,336 B2
(45) Date of Patent: Oct. 1, 2024

(54) CELL WAKE-UP VIA RACH FOR NETWORK POWER SAVINGS

(71) Applicant: QUALCOMM Incorporated, San Diego, CA (US)

(72) Inventors: Hung Dinh Ly, San Diego, CA (US); Krishna Kiran Mukkavilli, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/447,681

(22) Filed: Sep. 14, 2021

(65) Prior Publication Data

US 2023/0077869 A1  Mar. 16, 2023

(51) Int. Cl.
*H04W 52/02* (2009.01)
*H04W 74/0833* (2024.01)

(52) U.S. Cl.
CPC .......... *H04W 52/0235* (2013.01); *H04W 74/0833* (2013.01)

(58) Field of Classification Search
CPC ......... H04W 52/0235; H04W 74/0833; H04W 76/28; H04W 74/006; H04W 52/0206; Y02D 30/70
USPC ........................................................ 370/311
See application file for complete search history.

(56) References Cited

U.S. PATENT DOCUMENTS

| | | | | |
|---|---|---|---|---|
| 2012/0178383 | A1* | 7/2012 | Dottling | H04W 52/0235 |
| | | | | 455/73 |
| 2014/0314000 | A1* | 10/2014 | Liu | H04L 5/0035 |
| | | | | 370/329 |
| 2016/0066255 | A1 | 3/2016 | Marinier et al. | |
| 2018/0331801 | A1* | 11/2018 | Islam | H04L 5/0048 |
| 2020/0053637 | A1* | 2/2020 | Tsai | H04L 5/001 |
| 2020/0154354 | A1* | 5/2020 | Awoniyi-Oteri | H04W 72/23 |
| 2021/0266827 | A1* | 8/2021 | Frenger | H04L 12/12 |
| 2023/0262600 | A1* | 8/2023 | Wallentin | H04W 36/0088 |
| | | | | 370/311 |

OTHER PUBLICATIONS

International Search Report and Written Opinion dated Nov. 9, 2022 from corresponding PCT Application No. PCT/US2022/074710.

(Continued)

*Primary Examiner* — Kwang B Yao
*Assistant Examiner* — Syed M Bokhari
(74) *Attorney, Agent, or Firm* — QUALCOMM Incorporated

(57) ABSTRACT

Aspects are provided which allow a base station to provide RACH configuration(s) indicating RACH occasions which correspond to wake up occasions of a base station according to a power savings mode of the base station. The base station sends one or more RACH configurations indicating ROs to a UE, and then monitors the ROs associated with the power savings mode. The UE determines the ROs associated with the power savings mode, and sends a wake up signal to the base station in at least one of the determined ROs. The base station obtains the wake up signal from the UE in at least one of the monitored ROs. Here, the wake up signal comprises a RACH message. As a result, network power consumption may be optimized through designed configurations which allow a UE to wake up a sleeping base station via a RACH message.

30 Claims, 14 Drawing Sheets

(56) References Cited

OTHER PUBLICATIONS

3rd Generation Partnership Project; Technical Specification Group Radio Access Network; Study on RAN-centric data collection and utilization for LTE and NR (Release 16), 3GPP Standard; Technical Report; 3GPP TR 37.816, 3rd Generation Partnership Project (3GPP), Mobile Competence Centre; 650, Route Des Lucioles; F-06921 Sophia-Antipolis Cedex; France; No. V16.0.0 Jul. 23, 2019 (Jul. 23, 2019), pp. 1-35, XP051754713, Retrieved from the Internet: URL:ftp://ftp.3gpp.org/Specs/latest/Rel-16/37_series/37816-g00.zip 37816-g00.doc [retrieved on Jul. 23, 2019].

* cited by examiner

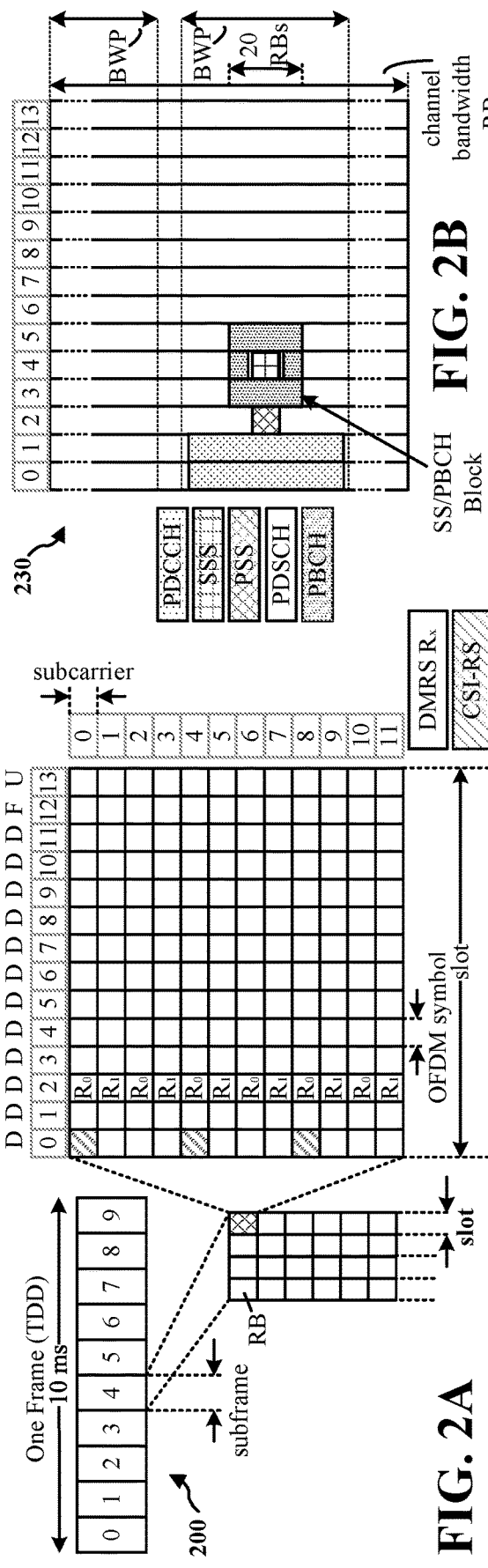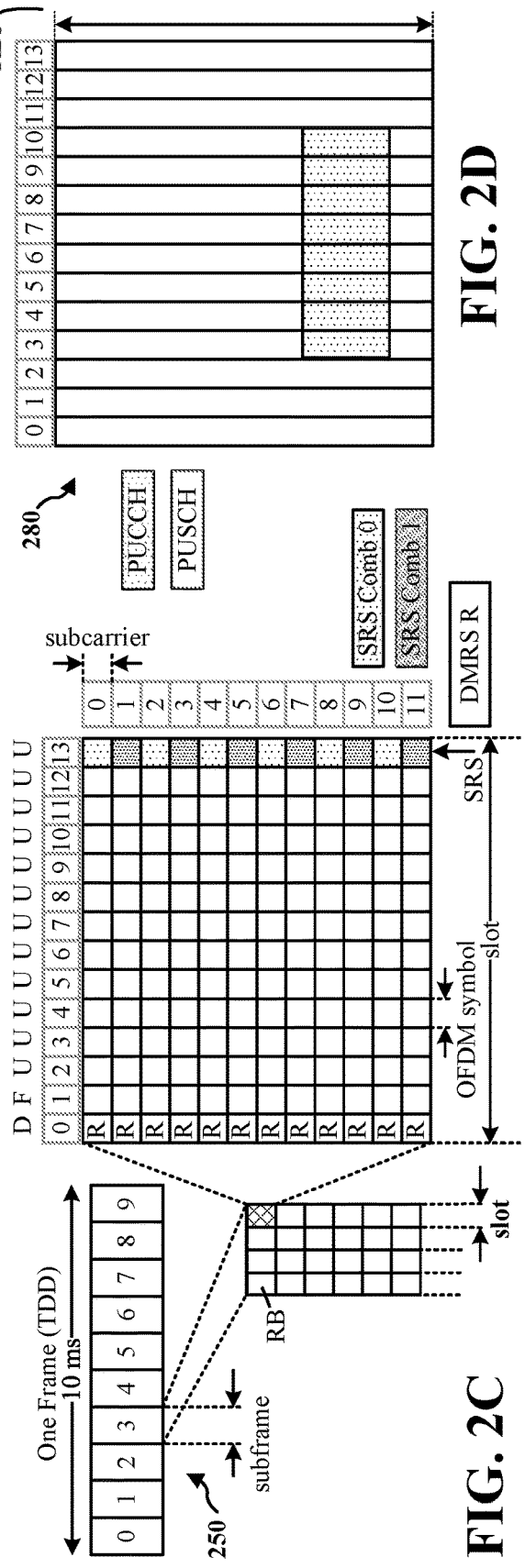
FIG. 2A
FIG. 2B
FIG. 2C
FIG. 2D

CELL WAKE-UP VIA RACH FOR NETWORK POWER SAVINGS

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE obtains one or more random access channel (RACH) configurations indicating RACH occasions (ROs), determines the ROs associated with a power savings mode of a base station, and sends a wake up signal to the base station in at least one of the determined ROs, where the wake up signal comprises a RACH message including a preamble in a physical random access channel (PRACH).

In an aspect of the disclosure, a method, a computer-readable medium, and an apparatus are provided. The apparatus may be a base station. The base station sends one or more RACH configurations indicating ROs to a UE, monitors the ROs associated with a power savings mode of the base station, and obtains a wake up signal from the UE in at least one of the monitored ROs, where the wake up signal comprises a RACH message including a preamble in a physical random access channel (PRACH).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
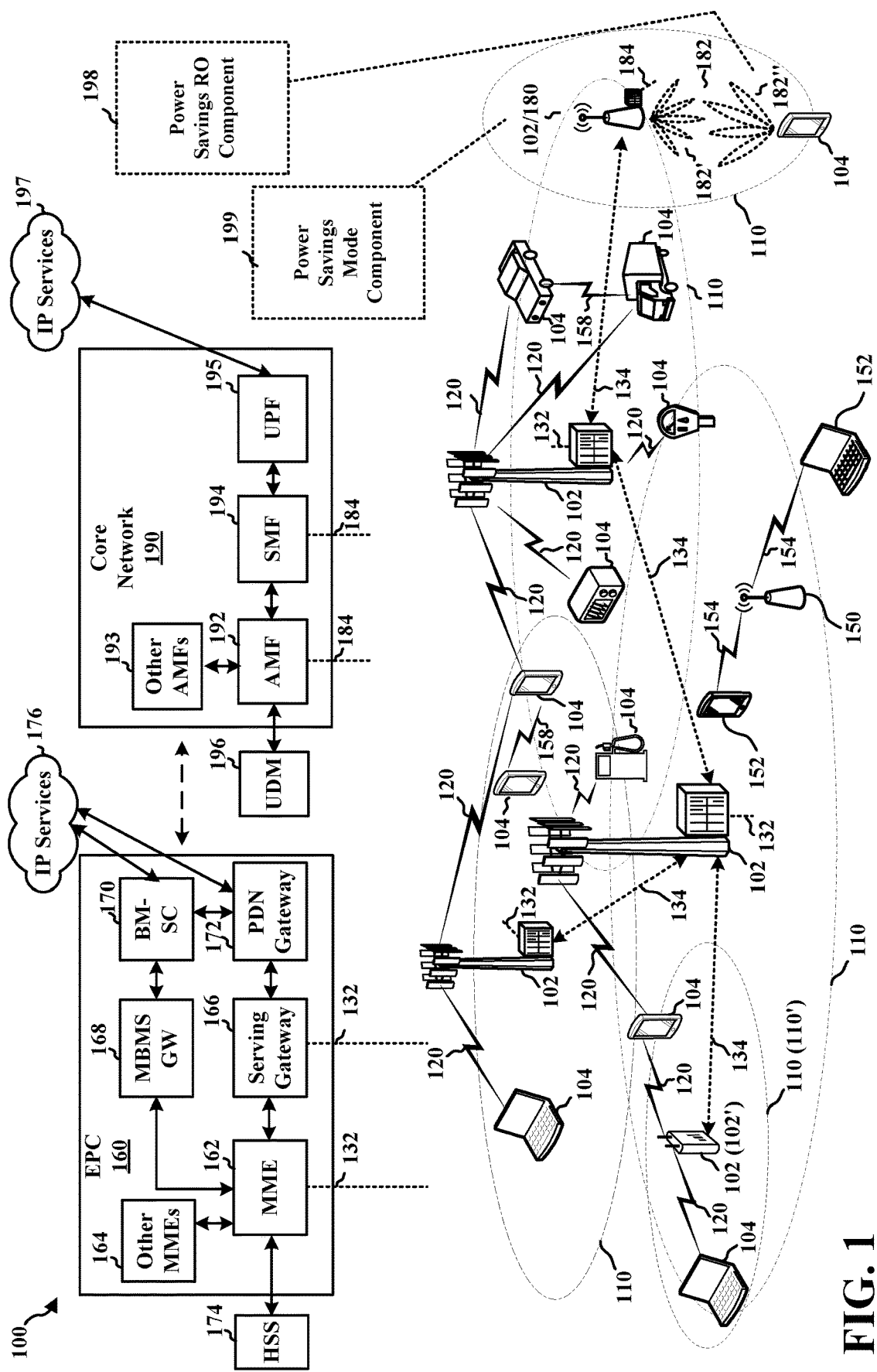
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In recent years following the advent of 5G/NR technology, a growing concern has arisen regarding the amount of power consumed by cellular networks. For example, 5G massive MIMO (mMIMO) technology, which enables an increase in data throughput compared to LTE MIMO technology (e.g., based on a larger number of antennas for transmission (Tx) or reception (Rx) and other factors), results in significantly higher power consumption than its earlier counterpart. Moreover, growing environmental factors such as carbon emissions also contribute to an increase in power consumed. As a result, the power consumption of cellular networks may significantly affect network operator expenditures (OPEX).

To help reduce the power consumption and associated OPEX, efforts by the network have been taken to achieve network energy savings. For example, networks have employed base station sleeping patterns in which radio components (e.g., antennas) of certain base stations are powered off during off-peak hours (e.g., midnight-3 AM) in order to reduce energy expenditure during those times. However, such efforts typically lack UE interaction or involvement; for example, UEs may not be configured to wake up these base stations during off-peak hours. Therefore, it would be helpful to optimize network power consumption and energy efficiency by involving the UE in such efforts.

To this end, aspects of the present disclosure design configuration(s) which allow the UE to wake up a sleeping base station in a cell via a random access channel (RACH) message. In particular, aspects are provided which allow a base station to provide RACH configuration(s) indicating the ROs which correspond to wake up occasions, namely, the ROs in which RACH messages may serve as wake up signals for the base station, according to a power savings mode or sleep operation mode of the base station.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a power savings RO component 198 that is configured to obtain one or more RACH configurations indicating ROs, determine the ROs associated with a power savings mode of a base station, and send a wake up signal to the base station in at least one of the determined ROs, where the wake up signal comprises a RACH message including a preamble in a physical random access channel (PRACH).

Referring again to FIG. 1, in certain aspects, the base station 180 may include a power savings mode component 199 that is configured to send one or more RACH configurations indicating ROs to a UE, monitor the ROs associated with a power savings mode of the base station, and obtain a wake up signal from the UE in at least one of the monitored ROs, where the wake up signal comprises a RACH message including a preamble in a physical random access channel (PRACH).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
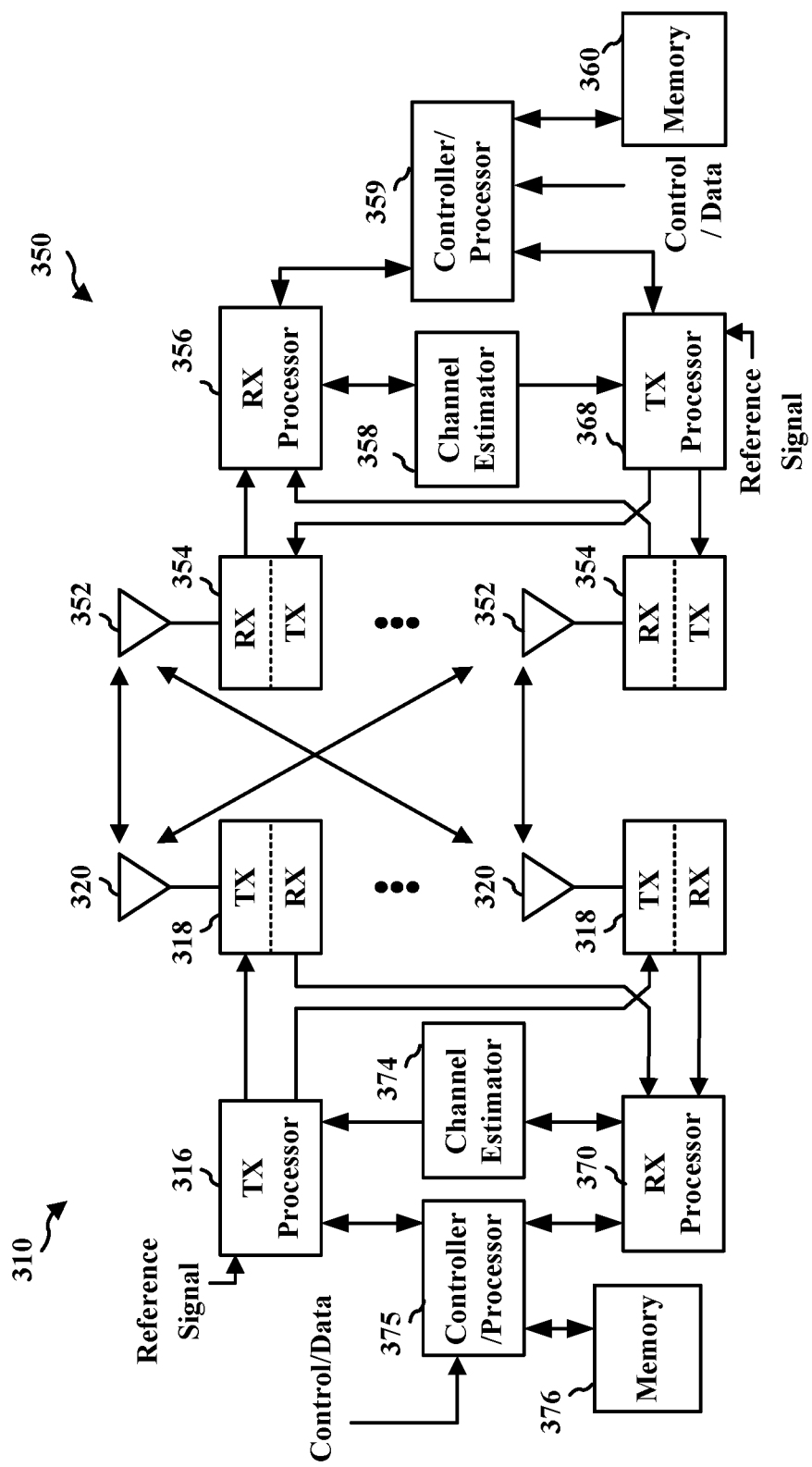
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with power savings RO component 198 of FIG. 1.

At least one of the TX processor 316, the RX processor 370, and the controller/processor 375 may be configured to perform aspects in connection with power savings mode component 199 of FIG. 1.

In recent years following the advent of 5G/NR technology, a growing concern has arisen regarding the amount of power consumed by cellular networks. For example, 5G mMIMO technology, which enables an increase in data throughput compared to LTE MIMO technology (e.g., based on a larger number of antennas for Tx or Rx and other factors), results in significantly higher power consumption than its earlier counterpart. Moreover, growing environmental factors such as carbon emissions also contribute to an increase in power consumed. As a result, the power consumption of cellular networks may significantly affect network OPEX.

Figure 4:
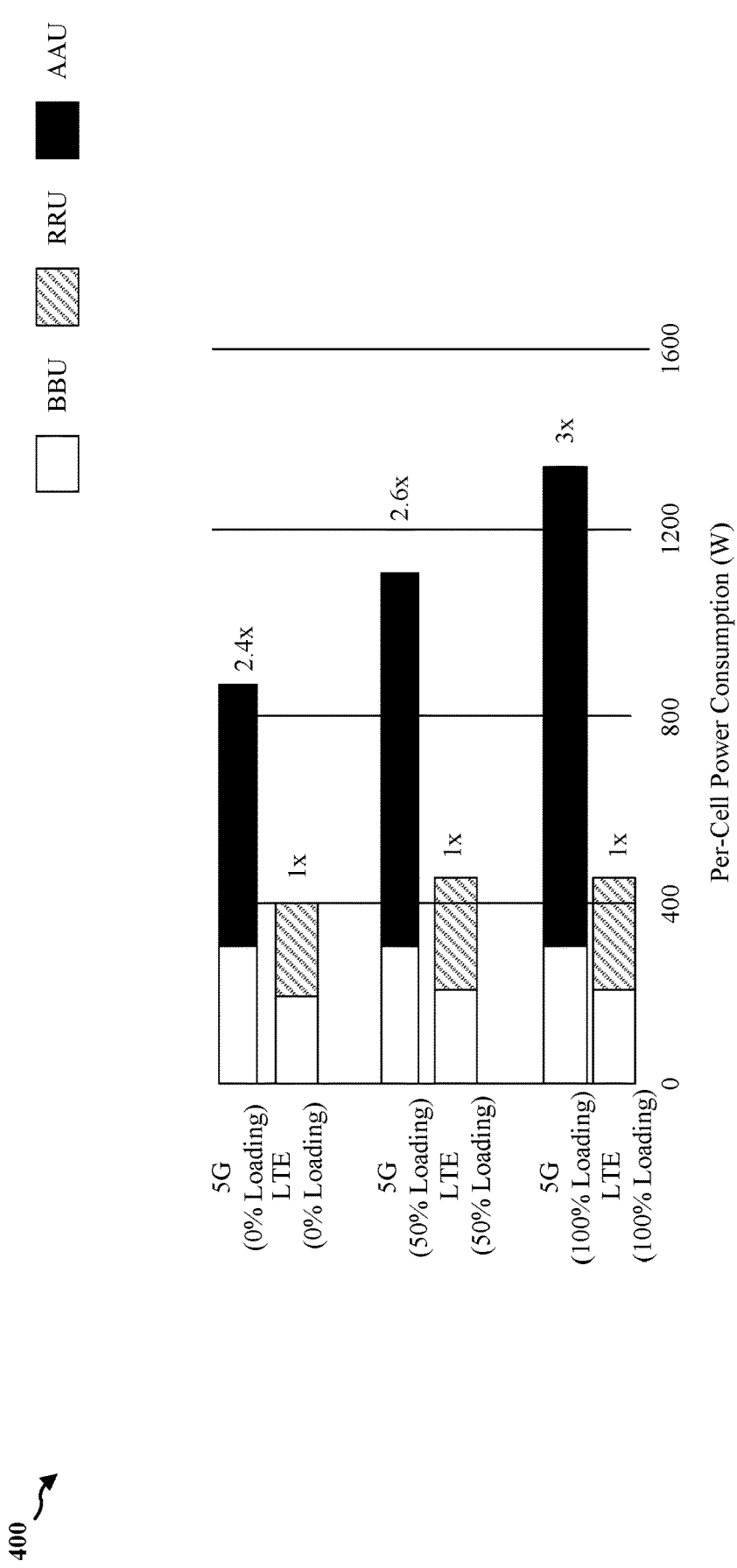
FIG. 4 is a diagram illustrating an example chart showing differences in per-cell power consumption between different radio access technology (RAT) deployments in various loading scenarios.

FIG. 4 illustrates an example chart 400 showing differences in per-cell power consumption between 4G/LTE and 5G/NR deployments in various loading scenarios, namely 100% loading (e.g., total system resources are currently being used for MIMO/mMIMO data transmissions), 50% loading (e.g., half of total system resources are currently being used for MIMO/mMIMO data transmissions), and 0% loading (e.g., no system resources are currently being used for MIMO/mMIMO data transmissions). In 4G/LTE deployments, network power consumption may include the power consumed by baseband units (BBUs) and remote radio units (RRUs) in performing MIMO, while in 5G/NR deployments, network power consumption may include the power consumed by BBUs and active (or adaptive) antenna units (AAUs) in performing mMIMO. Network power consumption may also include the power consumed for air conditioning to cool down the base stations (e.g., the BBUs/RRUs/AAUs). As loading increases, the total network power consumption of base stations may also increase.

Thus, as illustrated in the example chart 400, network power consumption for 5G/NR deployments may be significantly greater than network power consumption for 4G/LTE deployments. As shown in FIG. 4, this difference in power may be most apparent from the power consumption of AAUs, which can amount to 90% of total network power consumption in 5G/NR. This power, combined with that of the BBUs in the illustrated example, may amount to approximately 2.4-3 times the amount of power consumed in 4G/LTE deployments at maximum loading. Such significant increase in power may occur in response to, for example, the use of higher frequency bands, wider bandwidths, and more Tx/Rx antennas in 5G/NR compared to 4G/LTE, among other factors. As a result, maximizing mMIMO data throughput may result in significant OPEX for a network operator. For instance, electricity costs associated with base stations may typically amount to nearly 20% of overall network operating costs, and in some cases, such electricity costs may even amount to more than half of total profits.

To help reduce the power consumption and associated OPEX, efforts by the network have been taken to achieve network energy savings. For example, networks have employed base station sleeping patterns in which radio components (e.g., antennas) of certain base stations are powered off during off-peak hours (e.g., midnight-3 AM) in order to reduce energy expenditure during those times. In other examples, base stations serving a primary cell (PCell) and one or more secondary cells (SCells) may save power by powering off antennas covering SCell(s), or base stations including multiple transmission/reception points (mTRPs) may reduce power consumption by deactivating one or more panels of a TRP (resulting in dormant antenna panels). However, such efforts typically lack UE interaction or involvement; for example, UEs may not be configured to wake up these base stations during off-peak hours. Therefore, it would be helpful to optimize network power consumption and energy efficiency by involving the UE in such efforts. To this end, aspects of the present disclosure design configuration(s) which allow the UE to wake up a sleeping base station in a cell via a RACH message. For example, the base station may power on antennas covering SCell(s) or activate one or more dormant antenna panels (e.g., if mTRP) in response to the RACH message from the UE. The RACH message may be a physical random access channel (PRACH) transmission including a preamble, such as message 1 in a four-step contention-based RACH procedure or a similar contention-free RACH procedure, or message A in a two-step contention-based or contention-free RACH procedure.

In a four-step contention-based RACH procedure, four messages may be provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step contention-based RACH procedure in which the UE sends a preamble and a payload in a first message. For example, message A ("msgA") of a two-step RACH procedure may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in a msgA transmission to the base station, while the base station may send the RAR and the RRC response message in a msgB transmission to the UE. Similarly, in a four-step type contention-free RACH procedure, three messages may be provided between a UE and a base station. For example, during beam recovery, a UE may receive a dedicated preamble from the base station, send the preamble to the base station (e.g., message 1), and receive a RAR from the base station (e.g., message 2). This process may similarly be simplified into a two-step contention-free RACH procedure such as described above, but where the UE receives the dedicated preamble and PUSCH resources from the base station prior to the UE sending the preamble and payload in the first message.

Figure 5:
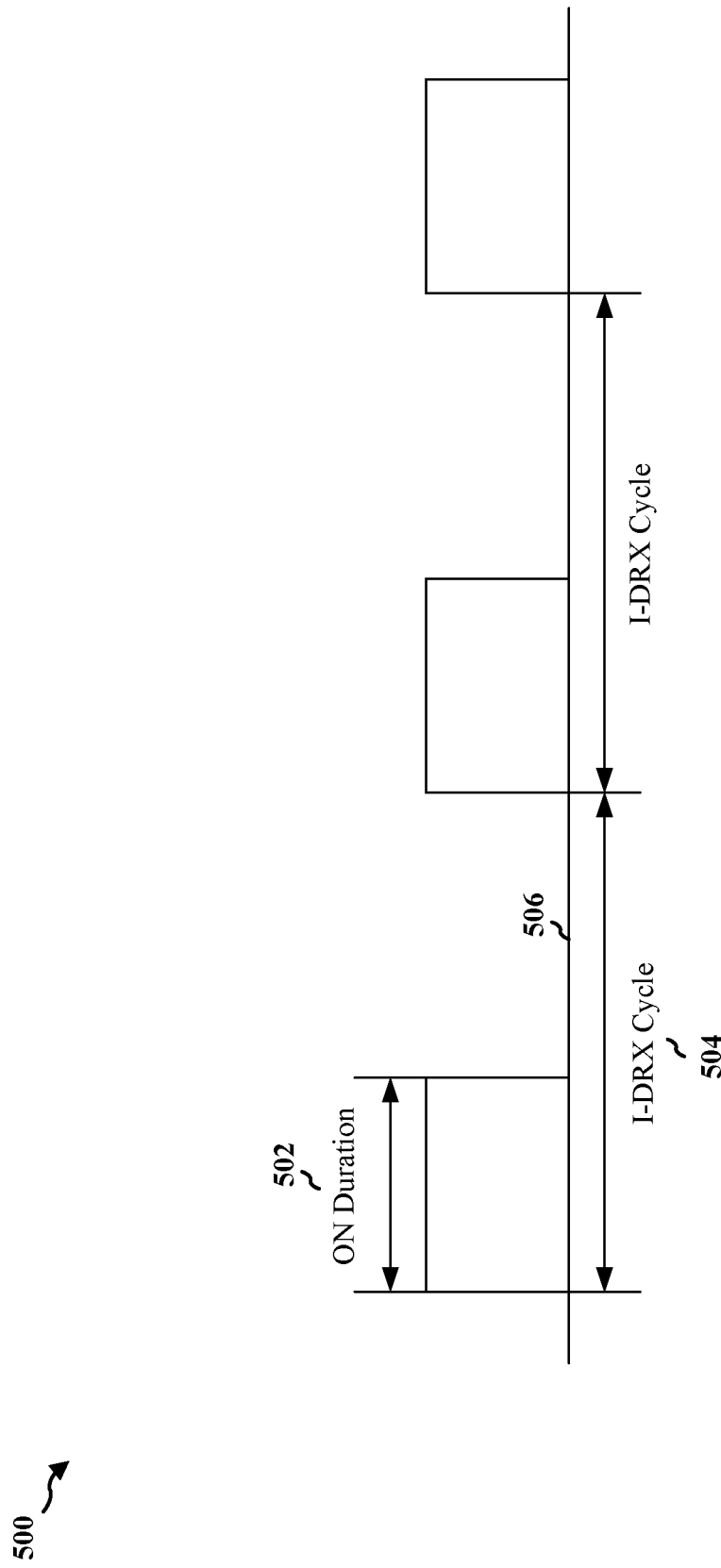
FIG. 5 is a diagram illustrating an example of idle/inactive mode discontinuous reception (I-DRX).
Figure 6:
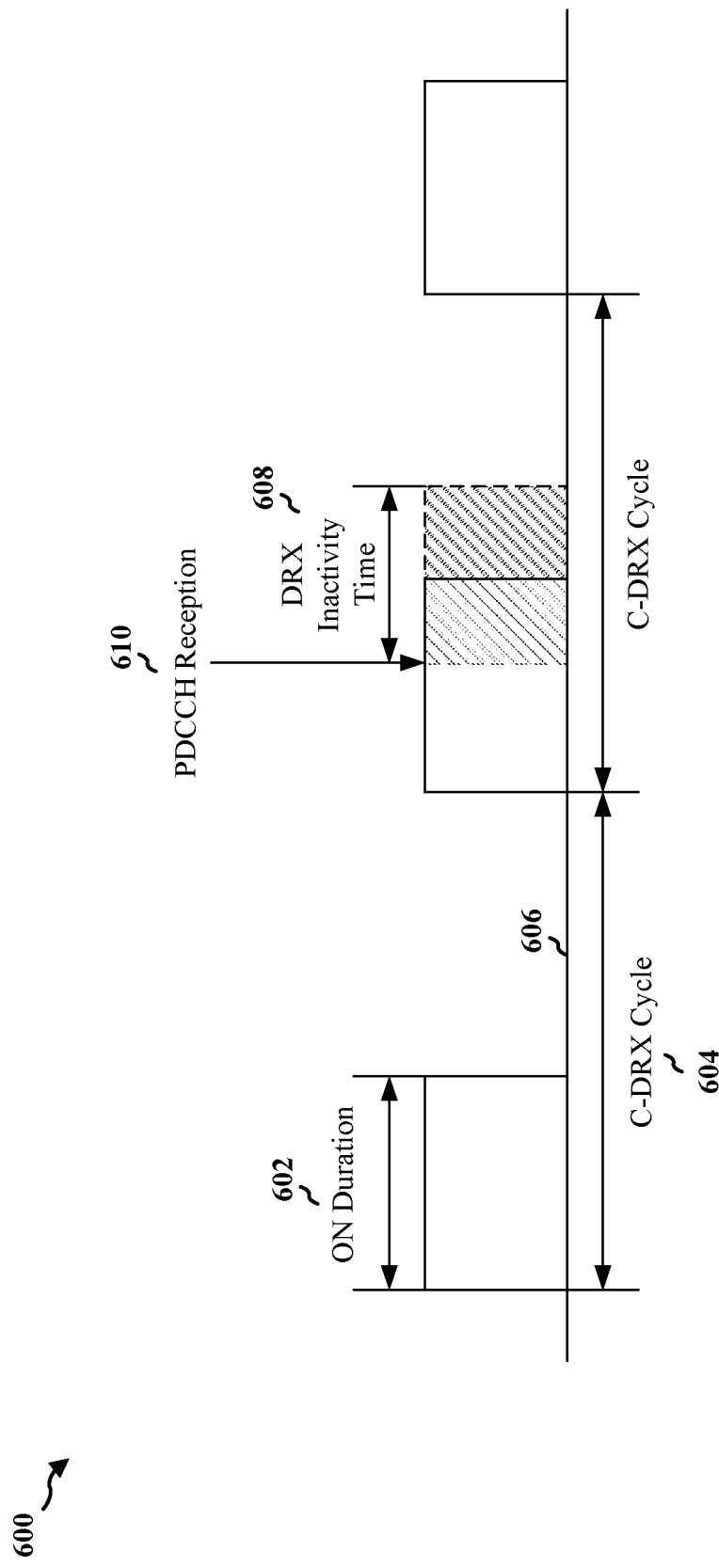
FIG. 6 is a diagram illustrating an example of connected mode DRX (C-DRX).

One method that a UE may generally implement for power savings is discontinuous reception (DRX). For instance, when the UE is in an idle mode or an inactive mode, the UE may perform idle/inactive mode DRX (I-DRX), and when the UE is in a connected mode, the UE may perform connected mode DRX (C-DRX). In I-DRX and C-DRX, the UE may wake up (e.g., supply power to its antennas 352, RX processor 356 and TX processor 368) during an on duration of a DRX cycle to monitor for a signal from the base station, and the UE may sleep (e.g., power down its antennas and RX/TX processors) during an off duration of the DRX cycle where a signal is not expected to be received. Such patterns of wake-up and sleep may conserve power of the UE. For instance, FIG. 5 illustrates an example 500 of a UE performing I-DRX in which the UE periodically monitors for paging information or performs RRM measurements during a DRX on duration 502 of a DRX cycle 504, while sleeping during a DRX off duration 506 of the DRX cycle. Similarly, FIG. 6 illustrates an example 600 of a UE performing C-DRX in which the UE periodically monitors for control information in PDCCH during a DRX on duration 602 of a DRX cycle 604 and sleeps during a DRX off duration 606 of the DRX cycle. Moreover, in C-DRX, the on duration may effectively be extended by a DRX inactivity time 608, which extension may be triggered in response to a PDCCH reception 610 at the UE during the DRX on duration. For example, the UE may communicate with the base station (e.g., in PDSCH or PUSCH) during the DRX inactivity time in response to receiving either a downlink grant or an uplink grant at the time of the PDCCH reception.

Generally, when the UE is performing DRX, the UE and base station may sleep during the off durations 506, 606 of the DRX cycles in attempt to save power. For example, the base station may wake up (e.g., power up its antennas 320, RX processor 370 and TX processor 316) during a DRX on duration of the UE and sleep (e.g., power down its antennas and RX/TX processors) during a DRX off duration of the UE. However, in some cases, the UE and base station may wake up even during DRX off durations in order to handle certain UE-specific receptions or transmissions. For instance, when the UE is in the idle or inactive mode, the UE may transmit a RACH message at any time in a configured RACH occasion, notwithstanding I-DRX, in order to transition to the connected mode or to send small data transmissions in the idle/inactive mode. Moreover, when the UE is in the connected mode, the UE may transmit a RACH message in a configured RACH occasion outside of a C-DRX active time (e.g., outside of the DRX on duration and the DRX inactivity time) in order to re-synchronize with the network after losing uplink synchronization, or to perform beam failure recovery (e.g., in resources configured by parameter PRACH-ResourceDedicatedBFR or some other name). Other examples of UE-specific transmissions which may occur outside of the C-DRX active time include scheduling requests (SRs), configured grants, and dynamic grant PUSCH scheduled by PDCCH in the C-DRX active time. For instance, referring to FIG. 6, if the UE receives PDCCH during DRX on duration 602 which dynamically schedules a PUSCH transmission after the DRX inactivity time 608 elapses, the UE may end up transmitting the PUSCH outside the C-DRX active time (e.g., during DRX off duration 606). Similarly, examples of UE-specific receptions which may occur outside of the C-DRX active time may include signals for radio resource management (RRM) measurements, radio link monitoring (RLM), system information (SI), semi-persistently scheduled (SPS) data in PDSCH, and dynamic grant PDSCH scheduled by PDCCH in the C-DRX active time.

Thus, when the UE transmits a RACH message (e.g., message 1 in a four-step RACH procedure or message A in a two-step RACH procedure), the RACH message transmission may not be limited by DRX. For instance, the RACH occasions (ROs) in which the UE may transmit RACH messages may be configured to occur outside of the DRX off duration in UE DRX cycles. A RO is the time-frequency resource(s) in which the UE may transmit PRACH (e.g., a RACH message including a preamble). Thus, since a UE effectively transmits RACH messages independently of DRX, the base station may not be able to abide by a DRX wake/sleep pattern in accordance with the UE's DRX cycle since the base station may still wake up during a DRX off duration to monitor for PRACH within ROs. Similarly, the base station may wake up during DRX off durations of DRX cycles to periodically monitor for the other aforementioned UE-specific transmissions or to periodically send the UE-specific receptions noted above. As a result, inefficient power consumption by the network may still result. Therefore, it would be helpful to optimize network energy efficiency by providing wake up occasions independent of DRX on durations, where the base station may consistently sleep between the wake up occasions.

Aspects of the present disclosure optimize network energy efficiency by designing configuration(s) which indicate the wake up occasions in which a UE may wake up a base station via a RACH message. Here, the configuration(s) may be one or more RACH configurations, and the wake up occasions may be ROs. For instance, in a cell with no traffic (e.g., 0% loading) and during each of the ROs indicated in a RACH configuration, the base station may wake up to monitor for a RACH message from the UE, and if no RACH message is detected, the base station may sleep between wake up occasions/ROs until the signal is eventually detected. This behavior may be in contrast to and improve upon DRX, since in DRX the base station may not sleep between DRX on durations due to any one of the UE-specific receptions or transmissions noted above. If the base station detects the RACH message in a RO, the base station may decode the RACH message and remain awake for a period of time after the RO before again reducing power to its antennas and resuming sleep. Such optimization may be of significant use for a cell with no traffic (e.g., in off-peak hours such as between midnight and 3 AM), during which time the base station may operate in a deep sleep mode (described below) or operate in some other power savings mode for improved network energy efficiency. Moreover, the configuration(s) may allow the UE to only wake up the base station in sparse occasions to monitor for a signal from the UE (e.g., in certain ROs), thereby reducing network power consumption and OPEX.

Figure 7:
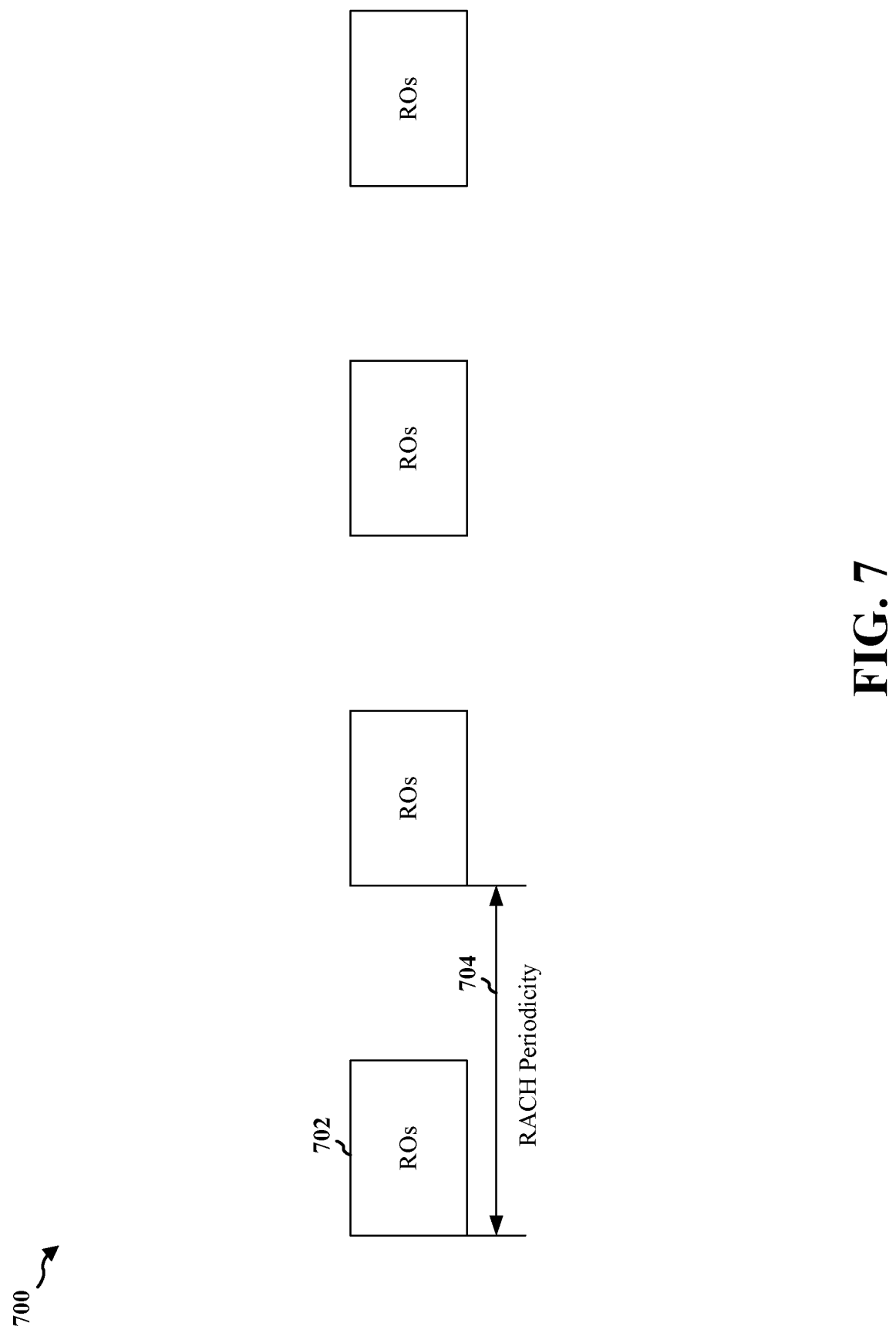
FIG. 7 is a diagram illustrating an example of ROs configured in a RACH configuration with a RACH period.

Currently, RACH configurations are configured in a system information block (e.g., SIB1). One of the parameters which the RACH configuration may indicate includes a RACH periodicity across configured time-frequency resources. For example, the RACH configuration may indicate a RACH periodicity of 10 ms, 20 ms, 40 ms, 80 ms, or 160 ms. Multiple ROs may be transmitted at different times (e.g., slots) within a RACH period. For instance, FIG. 7 illustrates an example 700 of ROs 702 configured in a RACH configuration with a RACH period 704 (e.g., 20 ms). RACH configurations may also be reconfigured at a rate of SIB1 periodicity, which generally may be, for example, 160 ms including multiple repetitions between SIBs. Thus, the base station may have an opportunity to update an RO configuration (e.g., the RACH periodicity 704 or other parameters of a RACH configuration) every 160 ms or other SIB1 periodicity. Once the UE acquires an SIB1, the UE may transmit the RACH message (e.g., during initial access, or as part of cell reselection).

In this way, a base station may configure wake up occasions according to the configured RACH periodicity (e.g., every 10-160 ms), and update the configuration of its wake up occasions according to the SIB1 periodicity (e.g., every 160 ms). Thus, a base station may sleep up to 160 ms at a time between ROs until a RACH message is detected. While increasing the maximum configurable periodicity above 160 ms (e.g., 320 ms, 640 ms, etc.) may result in longer sleep times and thus more network power savings especially in off-peak hours, such increase may result in longer PRACH transmission latencies and affect association pattern period mappings. Thus, it would be helpful to optimize network power savings independently of increasing a maximum configurable RACH periodicity (e.g., without increasing wake up occasion periodicity above 160 ms).

Accordingly, aspects of the present disclosure allow a base station to provide RACH configuration(s) indicating the ROs which correspond to wake up occasions, namely, the ROs in which RACH messages may serve as wake up signals for the base station, according to a power savings mode or sleep operation mode of the base station. These wake up occasions are separate from DRX on durations and the times between wake up occasions are separate from DRX off durations. Moreover, these wake up occasions allow for maximum configurable RACH periodicities/SIB1 periodicities (currently 160 ms) to be maintained. In response to receiving the wake up signal (e.g., RACH message) in one of these ROs, the base station may power on antennas covering SCell(s), activate one or more dormant antenna panels (e.g., if mTRP), or perform other power consuming actions.

In one aspect, the base station may operate in a power savings mode in which the base station sleeps between wake up occasions. In one example, the base station may provide a single RACH configuration to the UE (e.g., RACH-ConfigCommon or some other name) including an RO configuration (e.g., RACH periodicity, time-frequency resources of ROs, etc.). The base station may indicate to the UE in the single RACH configuration whether the base station is operating in the power savings mode, and the UE may determine from the single RACH configuration which ROs serve as wake up occasions (referred to here as power savings ROs) and which ROs serve as conventional PRACH occasions. For example, the base station may provide a mask (e.g., a bitmap) associated with a given RO configuration which indicates the ROs corresponding (and not corresponding) to wake-up occasions. As an example, if the base station configures, in a RACH configuration to the UE, 8 ROs to occur every 20 ms, the base station may include an 8-bit mask in that RACH configuration indicating with 1's which ROs serve as wake up occasions (the power saving ROs) and indicating with 0's which ROs merely serve as PRACH occasions. In such case, each bit of the mask may correspond to a single RO. For instance, a bitmap of 10101010 may indicate to the UE that the base station wakes up every other RO during the 20 ms period, while a bitmap of 10001000 may indicate to the UE that the base station wakes up every 4 ROs during the 20 ms. The bitmap length may be different for other RO configurations (e.g., RO periods). Alternatively, if the base station is not in a power savings mode (e.g., the base station does not have a wake/sleep pattern), the base station may not include a bitmap in the RACH configuration, or if a bitmap is still included, the bitmap may contain only 0's (e.g., 00000000), indicating that no power savings ROs are configured and that all configured ROs merely serve as conventional PRACH occasions.

The base station may down-sample the number of power saving ROs configured within the single RACH configuration depending on a sleep operation mode of the base station. For instance, the base station may operate in a regular sleep mode (the power savings mode), a light sleep mode, or a deep sleep mode. In the regular sleep mode, wake up occasions/power savings ROs may be configured to occur in a portion of conventional PRACH occasions, such as described above. For instance, in a single RACH configuration for power-savings ROs and conventional PRACH occasions such as described above, the base station may include a 16-bit mask 1010101010101010 indicating to the UE that the base station wakes up every other RO during a 40 ms RACH period including 16 ROs while in regular sleep mode. In the light sleep mode, wake up occasions/power savings ROs may be configured to occur in a portion of the power savings ROs configured in the regular sleep mode (i.e., the base station may sleep longer in the light sleep mode than in the regular sleep mode). For instance, in the light sleep mode, the base station may down-sample the 16-bit mask in the example above to 1000100010001000, indicating to the UE that the base station wakes up every four ROs during the RACH period (down-sampled from every other RO to every four ROs) while in light sleep mode. In the deep sleep mode, wake up occasions/power savings ROs may be configured to occur in a portion of the power savings ROs configured in the light sleep mode (the base station may sleep longer in the deep sleep mode than in the light sleep mode). For instance, in the deep sleep mode, the base station may down-sample the 16-bit mask in the example above to 1000000010000000, indicating to the UE that the base station wakes up every eight ROs during the RACH period (down-sampled from every four ROs to every eight ROs) while in deep sleep mode. Thus, different levels of network energy efficiency may be obtained depending on the configured sleep operation mode of the base station.

In one example, the base station may indicate in the single RACH configuration which of the various sleep modes that the base station is currently operating. For example, the base station may include a mask in the RACH configuration including different amounts of down-sampling depending on the sleep mode as described above. In such case, the UE may determine the sleep mode based on the mask (e.g., if more wake up occasions, regular sleep mode, if fewer wake up occasions, light sleep mode, and if least wake up occasions, deep sleep mode, such as in the examples above). In another example, the base station may indicate multiple sets of ROs in the single RACH configuration, where each set of ROs is associated with a different sleep mode. For example, the base station may configure different sets of ROs in a given RACH period for each sleep mode in the same RACH configuration, such as a set of every other configured RO in regular sleep mode, a set of every four configured ROs in light sleep mode, and a set of every eight configured ROs in deep sleep mode. In such case, the base station may indicate to the UE which of the various sleep modes in which the base station is currently operating by providing a RRC message, medium access control (MAC) control element (MAC-CE), or DCI to the UE, and the UE may determine the sleep mode based on the RRC message, MAC-CE, or DCI. For instance, the base station may indicate through one or more parameters or bits in the RRC message, MAC-CE, or DCI whether the base station is operating in a power savings mode/regular sleep mode, light sleep mode, or deep sleep mode, and the UE may select one of the sets of ROs in the RACH configuration in which to transmit wake-up signals based on the parameters or bits.

In another example, the base station may provide multiple RACH configurations to the UE each including a different RO configuration (e.g., different RACH periodicities, time-frequency resources, etc.) or set of ROs. In such case, at least one of the configurations may correspond to a power savings mode, and the UE may determine from that configuration which ROs currently serve as wake up occasions/power savings ROs. For example, the base station may provide two RACH configurations to the UE, where a first one of the configurations may include a name indicative of a power savings mode (e.g., RACH-ConfigCommon-PowerSavings or some other name) or a parameter within the configuration which is indicative of the power savings mode (e.g., a bit, Boolean value, etc.). The UE may then determine which ROs correspond to wake up occasions from the first one of the configurations (the power-savings RACH configuration) and which ROs merely serve as conventional PRACH occasions from the remaining configuration (the non-power savings RACH configuration). Moreover, if multiple sleep modes are configured, the base station may provide additional RACH configurations with other RO configurations (e.g., different RACH periodicities, time-frequency resources, etc.) or sets of ROs, and the base station may associate each additional RACH configuration respectively to a different sleep mode (e.g., one RACH configuration or set of ROs for power savings mode/regular sleep mode, another RACH configuration or set of ROs for light sleep mode, and another RACH configuration or set of ROs for deep sleep mode). For example, the base station may provide at least a third RACH configuration to the UE including a name indicative of a sleep mode or a parameter within the configuration which is indicative of the sleep mode, and the UE may determine which ROs correspond to wake up occasions in the sleep mode from that additional RACH configuration. The base station may then indicate which of the multiple RACH configurations or set of ROs the UE is to apply for its RACH messages, for example, by providing a RRC message, MAC-CE, or DCI identifying the selected RACH configuration or set of ROs (e.g., through one or more parameters or bits).

Additionally, regardless of whether the base station provides a single RACH configuration or multiple RACH configurations indicating a power savings mode, once the base station receives a RACH message in an RO corresponding to a wake up occasion (an RO serving as a wake up signal), the base station may suspend the power savings mode and remain awake for a configured period of time (a cell active time). During this cell active time, the UE may transmit subsequent RACH messages during any configured RO within the cell active time, including conventional PRACH occasions not associated with wake up occasions, regardless of the currently applied power savings mode. For example, until the cell active time expires in the case of a single RACH configuration, the UE may disregard the configured mask and transmit RACH messages in ROs assigned with 0's, or the UE may disregard an indicated set of power saving ROs in a RRC message, MAC-CE, or DCI and transmit RACH messages in non-power savings ROs. Similarly, until the cell active time expires in the case of multiple RACH configurations, the UE may disregard a currently applied RACH configuration or set of power saving ROs indicated in an RRC message, MAC-CE, or DCI and transmit RACH messages in non-power savings ROs.

Figure 8:
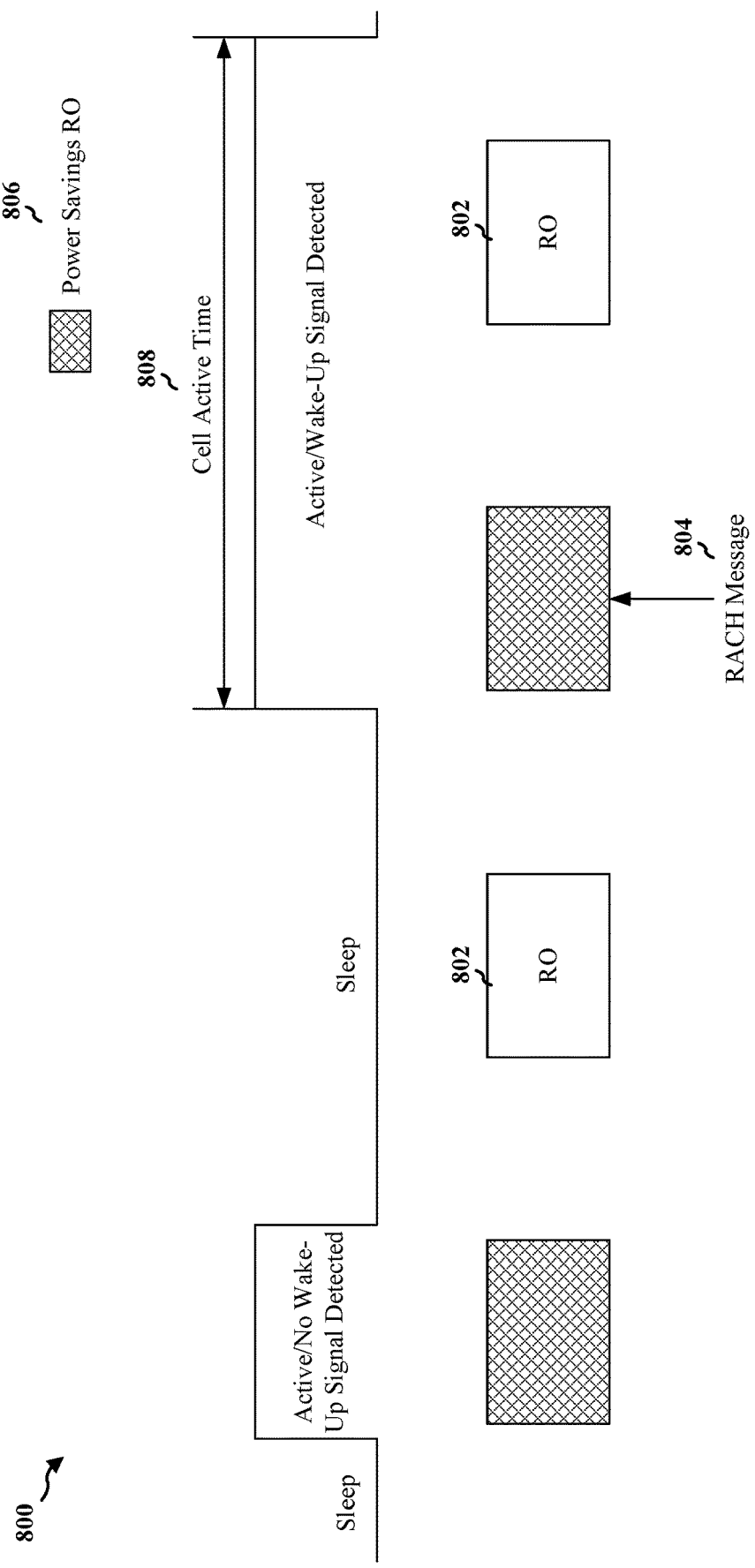
FIG. 8 is a diagram illustrating an example of power saving ROs in which a UE may transmit RACH messages serving as wake up signals for a base station.

FIG. 8 illustrates an example 800 of ROs 802 in which a UE may transmit a RACH message 804 (e.g., message 1 of a four-step RACH procedure or message A of a two-step RACH procedure). If the base station is in a power savings mode, power saving ROs 806 may be configured from a portion of the ROs 802 in order to allow for RACH messages to serve as wake up signals to the base station. That is, the base station may conserve energy by sleeping during some of the ROs 802 and monitoring for RACH messages (e.g., RACH message 804) during a remainder of the ROs (the power saving ROs 806). In this example, power saving ROs 806 may correspond to those ROs corresponding to wake up occasions which the base station may configure in either a single RACH configuration or in one of multiple RACH configurations according to any of the examples described above (e.g., through a mask, associated set of ROs, selected sleep mode, RRC/MAC-CE/DCI indication, etc.).

During each power savings RO 806, the base station may supply power to its antennas to monitor for a wake up signal (e.g., a RACH message) from the UE. If the base station does not detect a wake up signal in a power savings RO, such as illustrated in the leftmost side of the example of FIG. 8 (e.g., the UE does not transmit a RACH message during this time), the base station may power down its antennas to sleep until the next power saving RO. If the UE determines to transmit a RACH message in the interim, for example, as part of initial access or cell reselection, the UE waits until the next power saving RO to transmit the RACH message, since the UE may not transmit RACH messages during an RO while the base station is asleep in a power savings mode or indicated sleep mode. Once the base station detects the wake up signal (e.g., RACH message 804) in the next power savings RO, such as illustrated in the rightmost side of the example of FIG. 8, the base station may wake up (e.g., additionally supply power to its RX processor 370 and TX processor 316) to decode the RACH message 804. Moreover, in response to the wake-up signal, the base station may stay awake (e.g., continue to supply power to its antennas and RX/TX processors) for a configured period of time, referred to here as a cell active time 808, and the UE may transmit subsequent RACH messages during any configured RO within the cell active time. For instance, if the UE later intends to perform beam failure recovery while the cell is still active, the UE may transmit another RACH message during the RO 802 within that the cell active time. Once the cell active time expires, the base station may stop supplying power to its antennas and RX/TX processors to resume its sleep/wake pattern.

Figure 9:
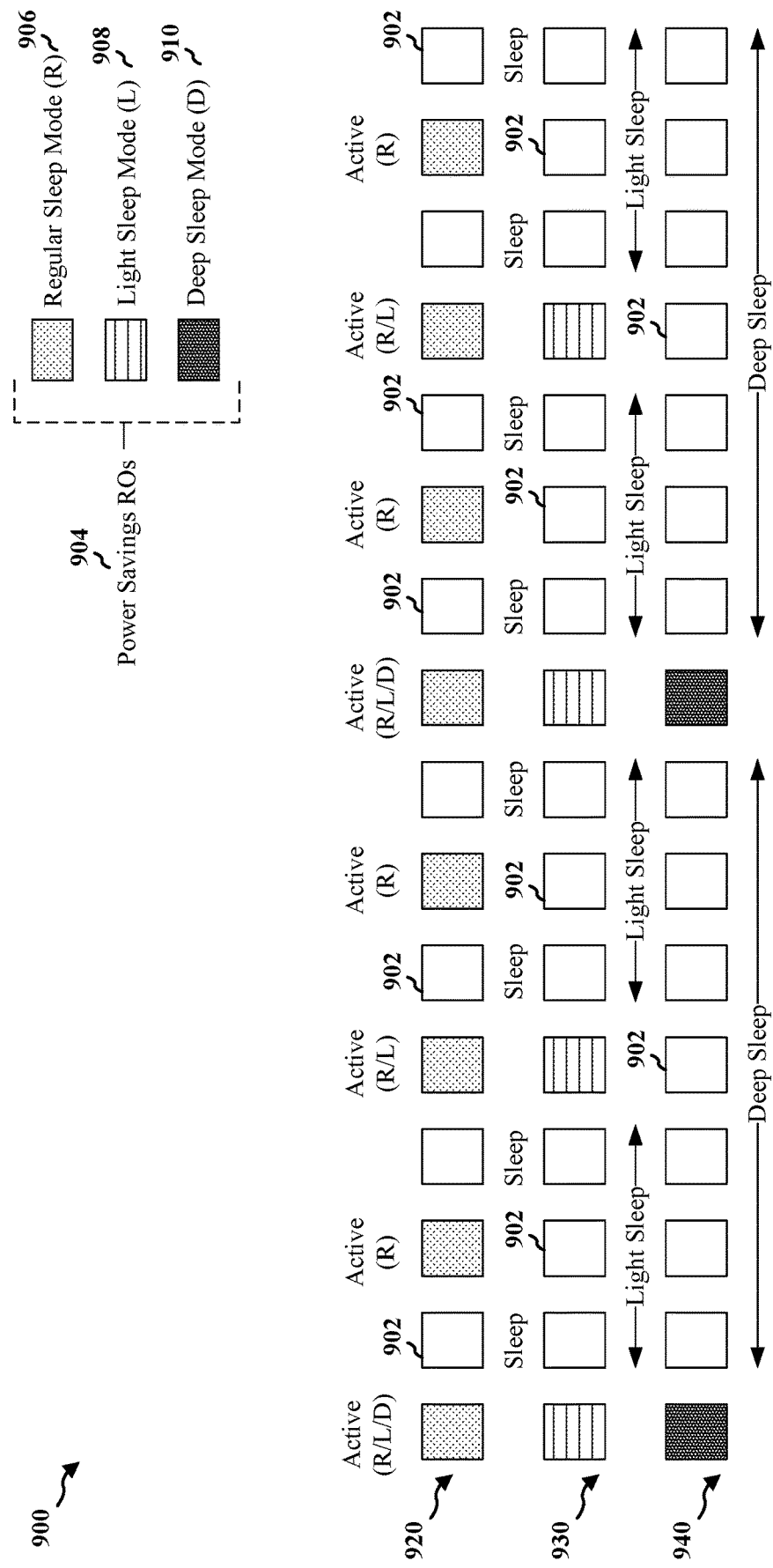
FIG. 9 is a diagram illustrating another example of power saving ROs in which a UE may transmit RACH messages serving as wake up signals for a base station.

FIG. 9 illustrates another example 900 of ROs 902 in which a UE may transmit a RACH message. Similar to the example of FIG. 8, if the base station is in a power savings mode, power saving ROs 904 may be configured from a portion of the ROs 902 in order to allow for RACH messages to serve as wake up signals to the base station. That is, power saving ROs 904 may correspond to power savings ROs 806 of FIG. 8. Moreover, the base station may down-sample the power saving ROs 904 based on a configured sleep operation mode of the base station. For example, the base station may operate in a regular sleep mode (the power savings mode), a light sleep mode, or a deep sleep mode. The light sleep mode and deep sleep mode may be sub-modes of the power savings mode. The number of power savings ROs 904 in the regular sleep mode (e.g., regular sleep mode ROs 906) may be larger than the number of power savings ROs 904 in the light sleep mode (e.g., light sleep mode ROs 908), and the number of power savings ROs 904 in the light sleep mode (e.g., light sleep mode ROs 908) may be larger than the number of power savings ROs 904 in the deep sleep mode (e.g., deep sleep mode ROs 910), such as illustrated in FIG. 9. Moreover, similar to the example of FIG. 8, the base station may configure the power saving ROs 904 associated with the sleep modes in either a single RACH configuration or in one of multiple RACH configurations according to any of the examples described above.

Example 900 illustrates three sub-examples 920, 930, 940 of power savings ROs 904 in the different sleep modes, respectively. The examples are not limited to those shown; in other examples, different ROs than those illustrated may be configured as power savings ROs in each sleep mode. Referring to the first sub-example 920, if the base station is in the regular sleep mode or power savings mode, the base station may configure a portion of the ROs 902 as power savings ROs 904 (e.g., regular sleep mode ROs 906), such as every other configured RO as illustrated in example 900. This example may be similar to that shown in FIG. 8, although in other examples, different ROs may be configured as power saving ROs than those shown. Referring to the second sub-example 930, if the base station is in the light sleep mode, the base station may configure a smaller portion of the ROs 902 as power savings ROs 904 than those in the regular sleep mode (e.g., light sleep mode ROs 908), for example, every four configured ROs as illustrated in example 900. In other examples, different ROs may be configured as power saving ROs than those shown. Referring to the third sub-example 940, if the base station is in the deep sleep mode, the base station may configure an even smaller portion of the ROs 902 as power savings ROs 904 than those in the light sleep mode (e.g., deep sleep mode ROs 910), for example, every eight configured ROs as illustrated in example 900. In other examples, different ROs may be configured as power saving ROs than those shown.

Figure 10:
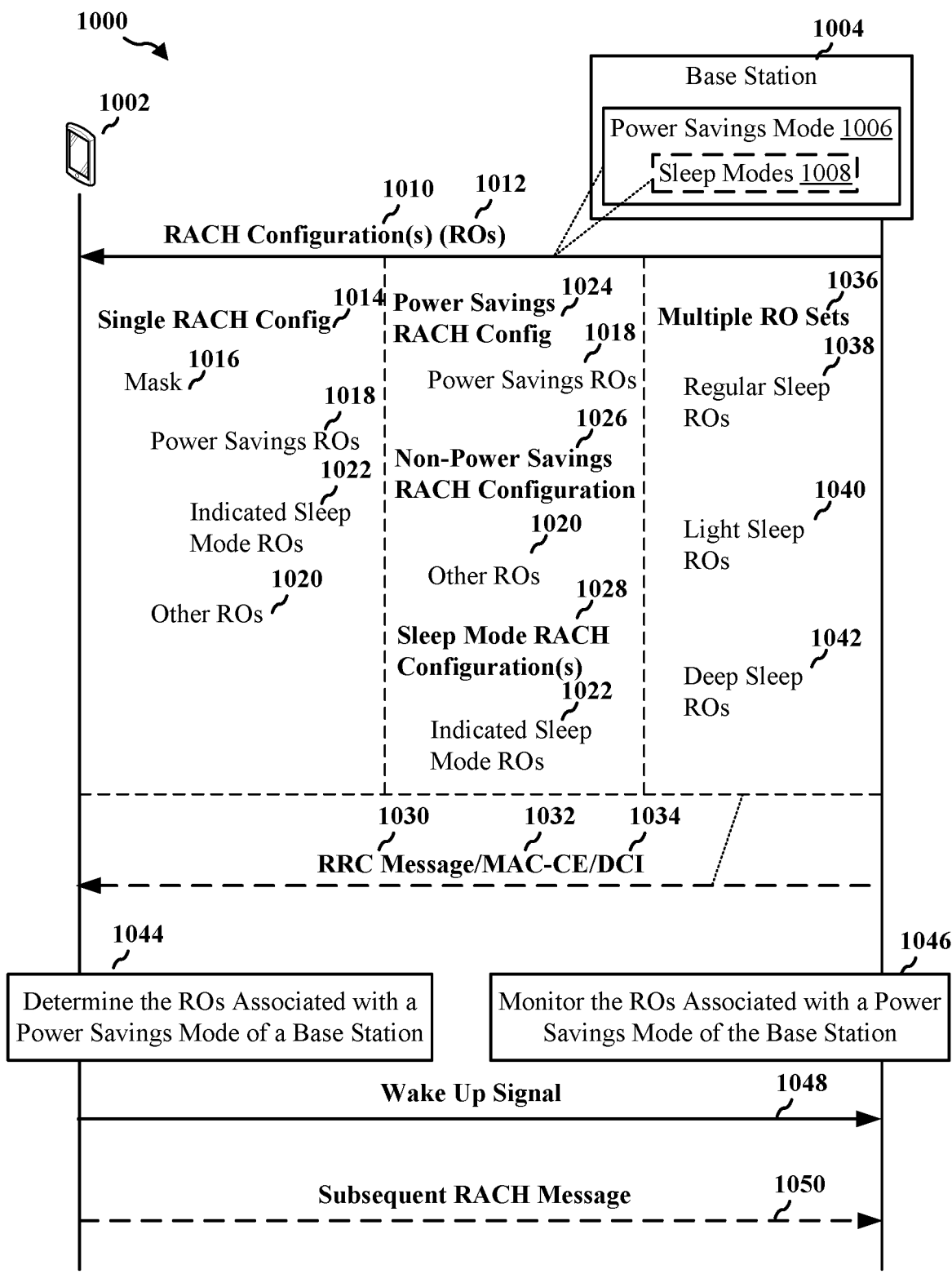
FIG. 10 is a diagram illustrating a call flow between a UE and a base station.

FIG. 10 illustrates an example 1000 of a call flow diagram between a UE 1002 and a base station 1004. The base station may operate in a power savings mode 1006 in which the base station sleeps between configured wake up occasions (power savings ROs). The power savings mode 1006 may also comprise a plurality of sleep modes 1008, including a regular sleep mode, light sleep mode, and deep sleep mode.

Initially, the base station 1004 may send to the UE 1002 one or more RACH configuration(s) 1010 configuring ROs 1012 (e.g., ROs 802 in FIG. 8 or ROs 902 in FIG. 9). In one example, the RACH configuration(s) 1010 may be a single RACH configuration 1014 which indicates whether the base station is operating in the power savings mode 1006. For example, the single RACH configuration 1014 may include a mask 1016 indicating which of the ROs 1012 correspond to wake-up occasions (power saving ROs 1018) and which of the ROs 1012 serve as conventional PRACH occasions (other ROs 1020). Here, power saving ROs 1018 may correspond to power savings ROs 806 in FIG. 8 or power savings ROs 904 in FIG. 9, and the mask 1016 may be a bitmap such as described above. In another example, the base station may down-sample the number of power saving ROs 1018 depending on the sleep mode 1008 in which the base station is currently operating, and the mask 1016 may indicate the ROs 1012 corresponding to wake-up occasions in the current sleep mode (indicated sleep mode ROs 1022).

Here, indicated sleep mode ROs 1022 may correspond to regular sleep mode ROs 906, light sleep mode ROs 908, or deep sleep mode ROs 910 in FIG. 9, and the mask 1016 may be a similar bitmap such as described above.

In another example, the RACH configuration(s) 1010 may be multiple RACH configurations configuring ROs 1012 (e.g., ROs 802 in FIG. 8 or ROs 902 in FIG. 9), rather than a single RACH configuration as described above. For instance, the base station 1004 may provide to the UE 1002 a power savings RACH configuration 1024 configuring the power savings ROs 1018 (e.g., power savings ROs 806, 904), and a non-power savings RACH configuration 1026 configuring the other ROs 1020. Moreover, if multiple sleep modes 1008 are configured (rather than just a single power savings mode), the base station may provide one or more sleep mode RACH configurations 1028 configuring the indicated sleep mode ROs 1022 for one or more of the sleep modes (e.g., regular sleep mode ROs 906, light sleep mode ROs 908, or deep sleep mode ROs 910). For example, the base station may provide a regular sleep mode RACH configuration (e.g., the power savings RACH configuration 1024) indicating regular sleep mode ROs, a light sleep mode RACH configuration indicating light sleep mode ROs, and a deep sleep mode RACH configuration indicating deep sleep mode ROs. Alternatively, the base station may combine regular sleep mode ROs, light sleep mode ROs, or deep sleep mode ROs in one or more sleep mode RACH configurations. The base station may also indicate which of the multiple RACH configurations the UE is to apply for its RACH messages (e.g., the power savings RACH configuration 1024, non-power savings RACH configuration 1026, or sleep mode RACH configuration(s) 1028). For example, the base station may provide an RRC message 1030, a MAC-CE 1032, or a DCI 1034 to the UE including one or more parameters or bits identifying the RACH configuration to be applied.

In a further example, the RACH configuration(s) 1010 may include multiple RO sets 1036, where each of set of ROs is associated with a different one of the sleep modes 1008. For instance, if the base station 1004 is providing single RACH configuration 1014, the single RACH configuration 1014 may configure a set of regular sleep ROs 1038 (e.g., power saving ROs 806, 904, 1018 or regular sleep mode ROs 906) for the regular sleep mode, a set of light sleep ROs 1040 (e.g., light sleep mode ROs 908) for the light sleep mode, and a set of deep sleep ROs 1042 (e.g., deep sleep mode ROs 910) for the deep sleep mode. In such case, the base station may indicate in the RRC message 1030, MAC-CE 1032, or DCI 1034 (or in a different RRC message, MAC-CE, or DCI) which set of ROs the UE is to apply for its wake-up signals/RACH messages. Alternatively, if the base station is providing multiple RACH configurations (e.g., power savings RACH configuration 1024 and sleep mode RACH configuration(s) 1028), each RACH configuration may configure a different set of ROs associated with one of the sleep modes 1008. For instance, one of the RACH configurations (e.g., the power savings RACH configuration 1024) may indicate the set of regular sleep ROs 1038, another of the RACH configurations (e.g., one of the sleep mode RACH configurations 1028) may indicate the set of light sleep ROs 1040, and another of the RACH configurations (e.g., another one of the sleep mode RACH configurations 1028) may indicate the set of deep sleep ROs 1042. In such case, the base station may indicate in the RRC message 1030, MAC-CE 1032, or DCI 1034 (or in a different RRC message, MAC-CE, or DCI) which set of ROs (e.g., which configuration) the UE is to apply for its wake-up signals/RACH messages.

At block 1044, the UE 1002 may determine the ROs associated with a power savings mode of the base station 1004. For example, if the base station is providing single RACH configuration 1014 configuring ROs 1012 and the base station is operating in power savings mode 1006, the UE may determine from mask 1016 in the single RACH configuration which of these ROs correspond to power savings ROs 1018. Similarly, if the base station is operating in one of the sleep modes 1008 and down-samples the number of power savings ROs accordingly, the UE may determine the ROs corresponding to indicated sleep mode ROs 1022 (e.g., regular sleep mode ROs, light sleep mode ROs, or deep sleep mode ROs) from mask 1016 in the single RACH configuration. Alternatively, if the single RACH configuration configures multiple RO sets 1036 (one for each of the sleep modes 1008) and the base station indicates in RRC message 1030, MAC-CE 1032, or DCI 1034 which of the RO sets or sleep modes is being applied, the UE may determine from the RRC message, MAC-CE, or DCI the power saving ROs accordingly (regular sleep ROs 1038, light sleep ROs 1040, or deep sleep ROs 1042). In another example, if the base station is providing multiple RACH configurations configuring ROs 1012, for example, power savings RACH configuration 1024 and non-power savings RACH configuration 1026, and the base station indicates in RRC message 1030, MAC-CE 1032, or DCI 1034 that the base station is operating in power savings mode 1006 (e.g., through one or more parameters or bits), the UE may determine from power savings RACH configuration 1024 the ROs corresponding to power savings ROs 1018 in response to the RRC message, MAC-CE, or DCI. Similarly, if the base station provides one or more sleep mode RACH configuration(s) 1028 and the base station indicates in RRC message 1030, MAC-CE 1032, or DCI 1034 that the base station is operating in one of the sleep modes 1008 (e.g., through one or more parameters or bits), the UE may determine from the sleep mode RACH configuration(s) 1028 the indicated sleep mode ROs 1022 in response to the RRC message, MAC-CE, or DCI. Alternatively, if each of the multiple RACH configurations includes one of multiple RO sets 1036 (e.g., one for each of the sleep modes 1008) and the base station indicates in RRC message 1030, MAC-CE 1032, or DCI 1034 which of the RACH configurations, RO sets or sleep modes is being applied, the UE may determine from the RRC message, MAC-CE, or DCI the power saving ROs accordingly (e.g., regular sleep ROs 1038, light sleep ROs 1040, or deep sleep ROs 1042).

At block 1046, the base station 1004 may monitor the ROs associated with a power savings mode of the base station. For example, if the base station is providing single RACH configuration 1014 configuring ROs 1012 and the base station is operating in power savings mode 1006, the base station may supply power to its antennas 320 during the power savings ROs 1018 indicated in mask 1016 in the single RACH configuration. Similarly, if the base station is operating in one of the sleep modes 1008 and down-samples the number of power savings ROs accordingly, the base station may supply power to its antennas 320 during the indicated sleep mode ROs 1022 (e.g., regular sleep mode ROs, light sleep mode ROs, or deep sleep mode ROs) in mask 1016 in the single RACH configuration. Alternatively, if the single RACH configuration configures multiple RO sets 1036 (one for each of the sleep modes 1008) and the base station indicates in RRC message 1030, MAC-CE 1032, or DCI 1034 which of the RO sets or sleep modes is being applied, the base station may supply power to its antennas 320 during the power savings ROs (regular sleep ROs 1038, light sleep ROs 1040, or deep sleep ROs 1042) indicated in the RRC message, MAC-CE, or DCI accordingly. In another example, if the base station is providing multiple RACH configurations configuring ROs 1012, for example, power savings RACH configuration 1024 and non-power savings RACH configuration 1026, and the base station indicates in RRC message 1030, MAC-CE 1032, or DCI 1034 that the base station is operating in power savings mode 1006 (e.g., through one or more parameters or bits), the base station may supply power to its antennas 320 during the power savings ROs 1018 configured in power savings RACH configuration 1024 according to the RRC message, MAC-CE, or DCI. Similarly, if the base station provides one or more sleep mode RACH configuration(s) 1028 and the base station indicates in RRC message 1030, MAC-CE 1032, or DCI 1034 that the base station is operating in one of the sleep modes 1008 (e.g., through one or more parameters or bits), the base station may supply power to its antennas 320 during the indicated sleep mode ROs 1022 configured in sleep mode RACH configuration(s) 1028 according to the RRC message, MAC-CE, or DCI. Alternatively, if each of the multiple RACH configurations includes one of multiple RO sets 1036 (e.g., one for each of the sleep modes 1008) and the base station indicates in RRC message 1030, MAC-CE 1032, or DCI 1034 which of the RACH configurations, RO sets or sleep modes is being applied, the base station may supply power to its antennas 320 during the power savings ROs (e.g., regular sleep ROs 1038, light sleep ROs 1040, or deep sleep ROs 1042) according to the RRC message, MAC-CE, or DCI.

After the UE 1002 determines the ROs associated with the power savings mode of the base station at block 1044, the UE may transmit a wake up signal 1048 (e.g., a RACH message such as RACH message 804 in FIG. 8) to the base station 1004 in one of the determined ROs (e.g., the power savings ROs 1018 or indicated sleep mode ROs 1022). Similarly, the base station 1004 that is monitoring the same ROs associated with the power savings mode at block 1046 may receive the wake up signal 1048 in the corresponding RO. The base station may then wake up (e.g., supply power to its RX/TX processors in addition to its antennas) in response to the wake-up signal and decode the RACH message, after which the base station may respond with a random access response in a four-step RACH procedure or message B in a two-step RACH procedure. The base station may also remain awake for a cell active time (e.g., cell active time 808 in FIG. 8) in response to receipt of the wake-up signal. In the event the UE loses uplink synchronization with the base station or intends to perform beam failure recovery, the UE may transmit a subsequent RACH message 1050 to the base station in any of the configured ROs 1012 in the RACH configuration(s) 1010. For example, the UE may transmit and the base station may receive subsequent RACH message 1050 in one of the other ROs 1020 indicated in the single RACH configuration 1014 or non-power savings RACH configuration 1026.

Figure 11:
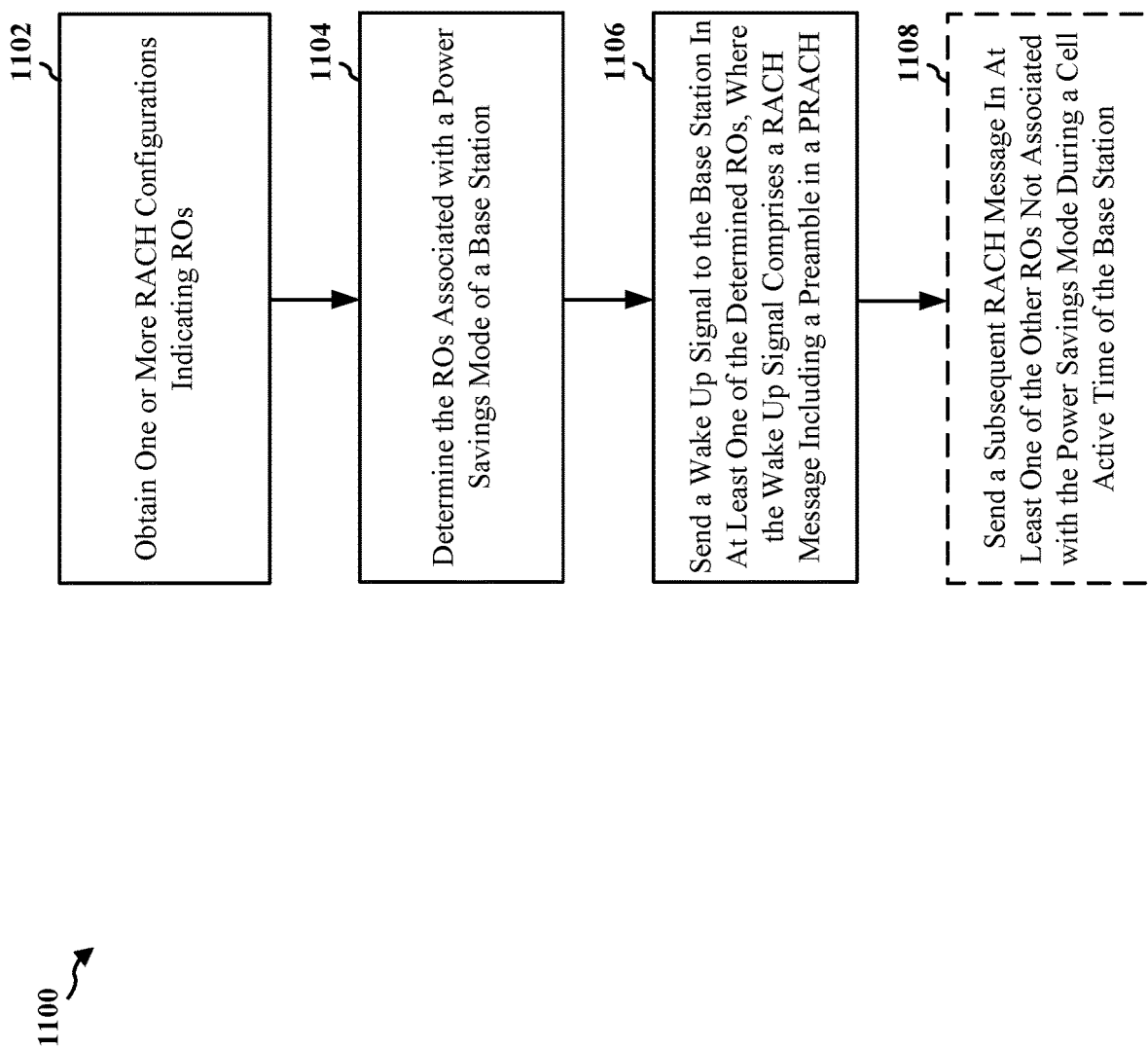
FIG. 11 is a flowchart of a method of wireless communication at a UE.

FIG. 11 is a flowchart 1100 of a method of wireless communication. The method may be performed by a UE (e.g., the UE 104, 350, 1002; the apparatus 1302). Optional aspects are illustrated in dashed lines. The method allows a UE to receive RACH configuration(s) and determine ROs corresponding to wake up occasions according to a power savings mode or sleep operation mode, and to transmit RACH messages as wake-up signals to the base station in the determined ROs.

At 1102, the UE obtains one or more RACH configurations indicating ROs. For example, 1102 may be performed by RACH configuration component 1340. For instance, referring to FIGS. 7-10, the UE 1002 may receive one or more RACH configuration(s) 1010 configuring ROs 1012 (e.g., ROs 702, 802, 902). For instance, the UE may obtain a SIB1 including RACH configuration(s) 1010 which may each indicate a RACH periodicity, configured time-frequency resources, or other parameters of configured ROs.

At 1104, the UE determines the ROs associated with a power savings mode of a base station. For example, 1104 may be performed by determination component 1342. For instance, referring to FIGS. 8-10, at block 1044, the UE 1002 may determine the ROs (e.g., power saving ROs 806, 904 1018, or indicated sleep mode ROs 1022 such as regular sleep mode ROs 906, 1038, light sleep mode ROs 908, 1040, or deep sleep mode ROs 910, 1042) associated with a power savings mode (e.g., power savings mode 1006 or one of multiple sleep modes 1008) of the base station 1004. The determined ROs associated with the power savings mode may include those ROs 1012 in the RACH configuration(s) 1010 which correspond to wake up occasions of the base station (in contrast to the other ROs 1020).

In one example, the one or more RACH configurations may comprise a single RACH configuration indicating the ROs associated with the power savings mode and other ROs not associated with the power savings mode. For instance, referring to FIG. 10, the RACH configuration(s) 1010 may be single RACH configuration 1014 which indicates the power saving ROs 1018 associated with power savings mode 1006 (the ROs 1012 corresponding to wake up occasions) and the other ROs 1020 not associated with power savings mode 1006 (the ROs 1012 not corresponding to wake up occasions). In one example, the single RACH configuration may include a mask indicating the ROs associated with the power savings mode. For instance, referring to FIG. 10, single RACH configuration 1014 may include mask 1016 indicating which of the ROs 1012 are power saving ROs 1018 and which of the ROs 1012 do not correspond to wake up occasions. In such case, the UE may determine the power saving ROs 1018 at block 1044 based on the mask 1016. As an example, if the base station configures, in a RACH configuration to the UE, 8 ROs to occur every 20 ms, the base station may include an 8-bit mask in that RACH configuration indicating with 1's which ROs serve as wake up occasions (the power saving ROs) and indicating with 0's which ROs merely serve as PRACH occasions. In such case, each bit of the mask may correspond to a single RO. For instance, a bitmap of 10101010 may indicate to the UE that the base station wakes up every other RO during the 20 ms period, while a bitmap of 10001000 may indicate to the UE that the base station wakes up every 4 ROs during the 20 ms.

In one example, the power savings mode may comprise a plurality of sleep modes of the base station, the single RACH configuration may indicate one of the sleep modes, and the determined ROs may be associated with the indicated one of the sleep modes. For instance, referring to FIG. 10, the power savings mode 1006 may include multiple sleep modes 1008 (e.g., a regular sleep mode, light sleep mode, and deep sleep mode), and the power savings ROs 1018 determined at block 1044 from the single RACH configuration 1014 may include indicated sleep mode ROs 1022. In one example, the single RACH configuration may include a mask indicating the ROs associated with the indicated one of the sleep modes. For instance, referring to FIG. 10, single RACH configuration 1014 may include mask 1016 indicating which of the ROs 1012 correspond to wake-up occasions in a current sleep mode of the base station (e.g., regular sleep, light sleep, deep sleep), namely indicated sleep mode ROs 1022. In such case, the UE may determine the indicated sleep mode ROs 1022 at block 1044 based on the mask 1016. For example, in the regular sleep mode/power savings mode, the base station may include a 16-bit mask 1010101010101010 indicating to the UE that the base station wakes up every other RO during a 40 ms RACH period including 16 ROs while in regular sleep mode. In another example, in the light sleep mode, the base station may down-sample the 16-bit mask in the example above to 1000100010001000, indicating to the UE that the base station wakes up every four ROs during the RACH period (down-sampled from every other RO to every four ROs) while in light sleep mode. In a further example, in the deep sleep mode, the base station may down-sample the 16-bit mask in the example above to 1000000100000000, indicating to the UE that the base station wakes up every eight ROs during the RACH period (down-sampled from every four ROs to every eight ROs) while in deep sleep mode. In one example, the single RACH configuration may include a bit or other parameter indicating the current sleep mode of the base station. In another example, the mask in the single RACH configuration itself may indicate the current sleep mode (e.g., based on the number of 1's in the mask).

In one example, the one or more RACH configurations may comprise a first RACH configuration indicating the ROs associated with the power savings mode and a second RACH configuration indicating other ROs not associated with the power savings mode. For instance, referring to FIG. 10, the RACH configuration(s) 1010 may include power savings RACH configuration 1024 configuring power saving ROs 1018 (e.g., the ROs 1012 associated with power savings mode 1006 or corresponding to wake-up occasions) and non-power savings RACH configuration 1026 configuring other ROs 1020 (e.g., the ROs 1012 not associated with power savings mode 1006 or corresponding to conventional PRACH occasions). The power savings RACH configuration and non-power savings RACH configuration may indicate the different ROs through different RO configurations (e.g., different RACH periodicities, time-frequency resources, etc.). In one example, the power savings RACH configuration may include a name indicative of a power savings mode or a parameter within the configuration indicative of the power savings mode, in response to which the UE may determine that RACH configuration as indicating the power saving ROs 1018.

In one example, the power savings mode may comprise a plurality of sleep modes of the base station, the one or more RACH configurations may further comprise a third RACH configuration for one of the sleep modes, and the determined ROs may be associated with the third RACH configuration. For instance, referring to FIG. 10, the power savings mode 1006 may include multiple sleep modes 1008 (e.g., a regular sleep mode, light sleep mode, and deep sleep mode), and the base station may provide one or more sleep mode RACH configurations 1028 (in addition to the power savings RACH configuration 1024 and non-power savings RACH configuration 1026) which are associated with the sleep modes 1008. For example, the base station may provide a regular sleep mode RACH configuration indicating regular sleep mode ROs 906, a light sleep mode RACH configuration indicating light sleep mode ROs 908, and a deep sleep mode RACH configuration indicating deep sleep mode ROs 910. The UE may then determine the indicated sleep mode ROs 1022 at block 1044 from the sleep mode RACH configuration(s) 1028. For instance, the base station may provide an RRC message 1030, a MAC-CE 1032, or a DCI 1034 to the UE including one or more parameters or bits indicating the sleep mode RACH configuration(s) to be applied.

In one example, the power savings mode may comprise a plurality of sleep modes of the base station, the one or more RACH configurations may include multiple sets of the ROs, each of the sleep modes being associated with one of the multiple sets of ROs, and the determined ROs may be associated with an indicated one of the sleep modes in a radio resource control (RRC) message, a medium access control (MAC) control element (MAC-CE), or downlink control information (DCI). For instance, referring to FIG. 10, the power savings mode 1006 may include multiple sleep modes 1008 (e.g., a regular sleep mode, light sleep mode, and deep sleep mode), and the RACH configuration(s) 1010 may include multiple RO sets 1036. Here, RACH configuration(s) 1010 may be either the single RACH configuration 1014, or the power savings RACH configuration 1024 and/or sleep mode RACH configuration(s) 1028, and each set of ROs may be associated with a different one of the sleep modes 1008. The base station may also provide RRC message 1030, MAC-CE 1032, or DCI 1034 indicating one of the RO sets (e.g., sleep mode or configurations) to be applied, and the UE may determine the indicated sleep mode ROs 1022 at block 1044 from the set of ROs is indicated in the RRC message, MAC-CE, or DCI.

At 1106, the UE sends a wake up signal to the base station in at least one of the determined ROs, where the wake up signal comprises a RACH message including a preamble in a physical random access channel (PRACH). For example, 1106 may be performed by wake up signal component 1344. For instance, referring to FIG. 10, after the UE 1002 determines the ROs associated with the power savings mode of the base station at 1104, the UE may transmit a wake up signal 1048 (e.g., RACH message 804 in FIG. 8) to the base station 1004 in one of the determined ROs (e.g., the power savings ROs 1018 or indicated sleep mode ROs 1022 determined at block 1044). The RACH message may be a PRACH transmission including a preamble (e.g., message 1 in a four-step RACH procedure (contention-based or contention-free) or message A in a two-step RACH procedure (contention-based or contention-free)), which the UE may transmit during initial access or as part of cell reselection, for example. In response to the wake-up signal, the base station may wake up and decode the RACH message, after which the base station may respond to the UE with a random access response in a four-step RACH procedure or message B in a two-step RACH procedure. The base station may also remain awake for a cell active time (e.g., cell active time 808 in FIG. 8) in response to receipt of the wake-up signal.

Finally, at 1108, the UE may send a subsequent RACH message in at least one of the other ROs not associated with the power savings mode during a cell active time of the base station. For example, 1108 may be performed by subsequent RACH message component 1346. The at least one of the other ROs may be indicated in either the single RACH configuration or the second RACH configuration obtained at 1102. For instance, referring to FIG. 10, the UE may transmit a subsequent RACH message 1050 to the base station in any of the configured ROs 1012 in the RACH configuration(s) 1010 which are not associated with power savings mode 1006 (e.g., power savings mode 1006 or sleep modes 1008), e.g., other ROs 1020 than power savings ROs 1018 and indicated sleep mode ROs 1022. In one example where the UE receives single RACH configuration 1014 from the base station, the UE may transmit subsequent RACH message 1050 in one of the other ROs 1020 indicated in the single RACH configuration 1014. In another example where the UE receives power-savings RACH configuration 1024 (a first RACH configuration) and non-power savings RACH configuration 1026 (a second RACH configuration), the UE may transmit subsequent RACH message 1050 in one of the other ROs 1020 indicated in the non-power savings RACH configuration. In either example, the UE may transmit subsequent RACH message 1050 in other ROs 1020 during the time that the base station remains awake for a cell active time (e.g., cell active time 808) in response to receiving wake-up signal 1048 from the UE at 1106. Subsequent RACH message 1050 may be a PRACH transmission including a preamble (e.g., message 1 in a four-step RACH procedure (contention-based or contention-free) or message A in a two-step RACH procedure (contention-based or contention-free)), which the UE may transmit in the event the UE loses uplink synchronization with the base station or performs beam failure recovery, for example.

Figure 12:
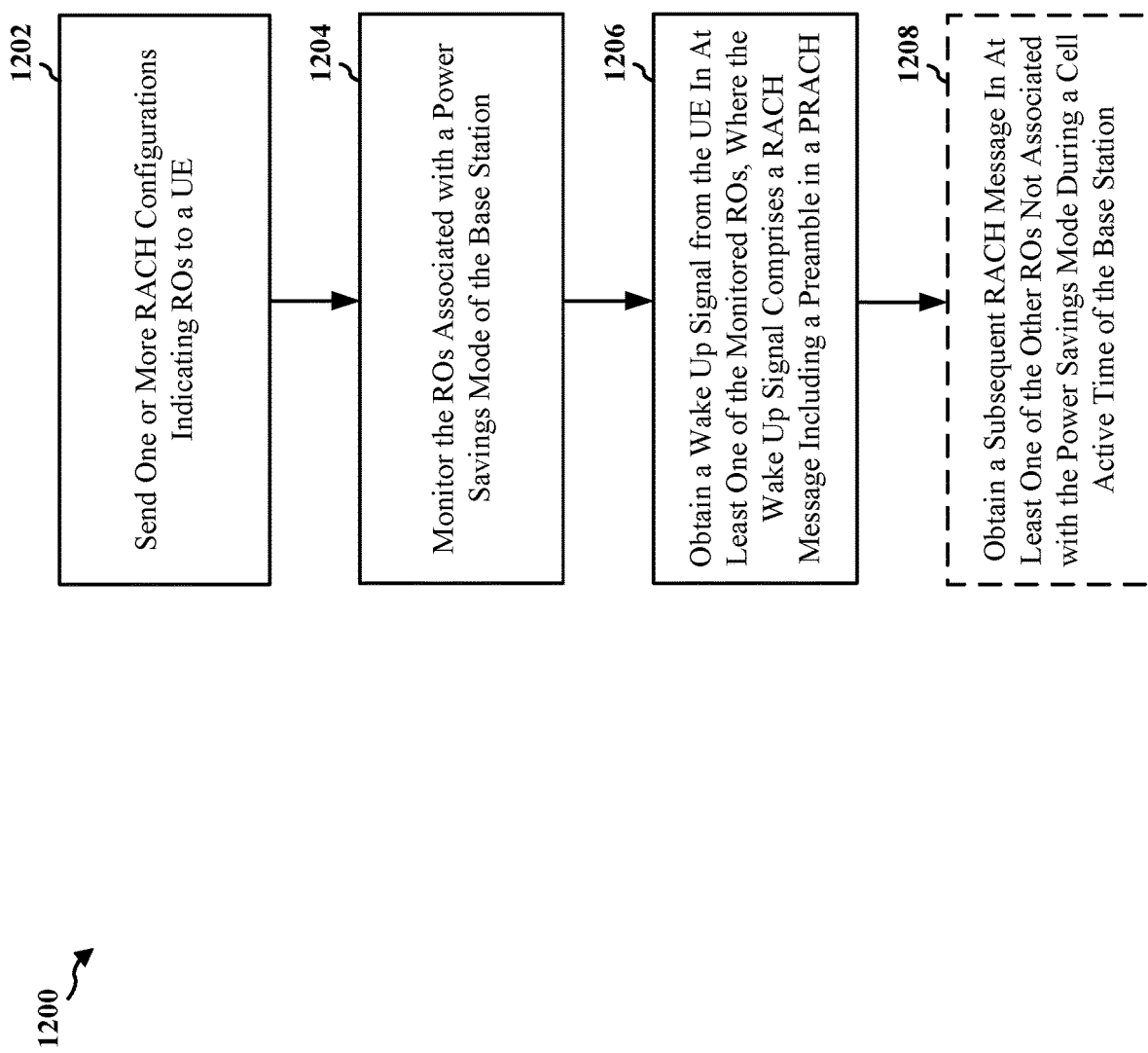
FIG. 12 is a flowchart of a method of wireless communication at a base station.

FIG. 12 is a flowchart 1200 of a method of wireless communication. The method may be performed by a base station (e.g., the base station 102/180, 310, 1004; the apparatus 1402. Optional aspects are illustrated in dashed lines. The method allows a base station to provide RACH configuration(s) and monitor ROs corresponding to wake up occasions according to a power savings mode or sleep operation mode, and to receive RACH messages as wake-up signals for the base station in the monitored ROs.

At 1202, the base station sends one or more RACH configurations indicating ROs to a UE. For example, 1202 may be performed by RACH configuration component 1440. For instance, referring to FIGS. 7-10, the base station 1004 may transmit one or more RACH configuration(s) 1010 configuring ROs 1012 (e.g., ROs 702, 802, 902). For instance, the base station may transmit a SIB1 including RACH configuration(s) 1010 which may each indicate a RACH periodicity, configured time-frequency resources, or other parameters of configured ROs.

At 1204, the base station monitors the ROs associated with a power savings mode of the base station. For example, 1204 may be performed by monitor component 1442. For instance, referring to FIGS. 8-10, at block 1046, the base station 1004 may monitor the ROs (e.g., power saving ROs 806, 904 1018, or indicated sleep mode ROs 1022 such as regular sleep mode ROs 906, 1038, light sleep mode ROs 908, 1040, or deep sleep mode ROs 910, 1042) associated with a power savings mode (e.g., power savings mode 1006 or one of multiple sleep modes 1008) of the base station 1004. The monitored ROs associated with the power savings mode may include those ROs 1012 in the RACH configuration(s) 1010 which correspond to wake up occasions of the base station (in contrast to the other ROs 1020).

In one example, the one or more RACH configurations may comprise a single RACH configuration indicating the ROs associated with the power savings mode and other ROs not associated with the power savings mode. For instance, referring to FIG. 10, the RACH configuration(s) 1010 may be single RACH configuration 1014 which indicates the power saving ROs 1018 associated with power savings mode 1006 (the ROs 1012 corresponding to wake up occasions) and the other ROs 1020 not associated with power savings mode 1006 (the ROs 1012 not corresponding to wake up occasions). In one example, the single RACH configuration may include a mask indicating the ROs associated with the power savings mode. For instance, referring to FIG. 10, single RACH configuration 1014 may include mask 1016 indicating which of the ROs 1012 are power saving ROs 1018 and which of the ROs 1012 do not correspond to wake up occasions. In such case, the base station may monitor the power saving ROs 1018 at block 1046 according to the mask 1016. As an example, if the base station configures, in a RACH configuration to the UE, 8 ROs to occur every 20 ms, the base station may include an 8-bit mask in that RACH configuration indicating with 1's which ROs serve as wake up occasions (the power saving ROs) and indicating with 0's which ROs merely serve as PRACH occasions. In such case, each bit of the mask may correspond to a single RO. For instance, a bitmap of 10101010 may indicate to the UE that the base station wakes up every other RO during the 20 ms period, while a bitmap of 10001000 may indicate to the UE that the base station wakes up every 4 ROs during the 20 ms.

In one example, the power savings mode may comprise a plurality of sleep modes of the base station, the single RACH configuration may indicate one of the sleep modes, and the monitored ROs may be associated with the indicated one of the sleep modes. For instance, referring to FIG. 10, the power savings mode 1006 may include multiple sleep modes 1008 (e.g., a regular sleep mode, light sleep mode, and deep sleep mode), and the power savings ROs 1018 monitored at block 1046 according to the single RACH configuration 1014 may include indicated sleep mode ROs 1022. In one example, the single RACH configuration may include a mask indicating the ROs associated with the indicated one of the sleep modes. For instance, referring to FIG. 10, single RACH configuration 1014 may include mask 1016 indicating which of the ROs 1012 correspond to wake-up occasions in a current sleep mode of the base station (e.g., regular sleep, light sleep, deep sleep), namely indicated sleep mode ROs 1022. In such case, the base station may monitor the indicated sleep mode ROs 1022 at block 1044 according to the mask 1016. For example, in the regular sleep mode/power savings mode, the base station may include a 16-bit mask 1010101010101010 indicating to the UE that the base station wakes up every other RO during a 40 ms RACH period including 16 ROs while in regular sleep mode. In another example, in the light sleep mode, the base station may down-sample the 16-bit mask in the example above to 1000100010001000, indicating to the UE that the base station wakes up every four ROs during the RACH period (down-sampled from every other RO to every four ROs) while in light sleep mode. In a further example, in the deep sleep mode, the base station may down-sample the 16-bit mask in the example above to 1000000010000000, indicating to the UE that the base station wakes up every eight ROs during the RACH period (down-sampled from every four ROs to every eight ROs) while in deep sleep mode. In one example, the single RACH configuration may include a bit or other parameter indicating the current sleep mode of the base station. In another example, the mask in the single RACH configuration itself may indicate the current sleep mode (e.g., based on the number of 1's in the mask).

In one example, the one or more RACH configurations may comprise a first RACH configuration indicating the ROs associated with the power savings mode and a second RACH configuration indicating other ROs not associated with the power savings mode. For instance, referring to FIG. 10, the RACH configuration(s) 1010 may include power savings RACH configuration 1024 configuring power saving ROs 1018 (e.g., the ROs 1012 associated with power savings mode 1006 or corresponding to wake-up occasions) and non-power savings RACH configuration 1026 configuring other ROs 1020 (e.g., the ROs 1012 not associated with power savings mode 1006 or corresponding to conventional PRACH occasions). The power savings RACH configuration and non-power savings RACH configuration may indicate the different ROs through different RO configurations (e.g., different RACH periodicities, time-frequency resources, etc.). In one example, the power savings RACH configuration may include a name indicative of a power savings mode or a parameter within the configuration indicative of the power savings mode, according to which the base station may monitor the power savings ROs 1018 indicated in that RACH configuration.

In one example, the power savings mode may comprise a plurality of sleep modes of the base station, the one or more RACH configurations may further comprise a third RACH configuration for one of the sleep modes, and the monitored ROs may be associated with the third RACH configuration. For instance, referring to FIG. 10, the power savings mode 1006 may include multiple sleep modes 1008 (e.g., a regular sleep mode, light sleep mode, and deep sleep mode), and the base station may provide one or more sleep mode RACH configurations 1028 (in addition to the power savings RACH configuration 1024 and non-power savings RACH configuration 1026) which are associated with the sleep modes 1008. For example, the base station may provide a regular sleep mode RACH configuration indicating regular sleep mode ROs 906, a light sleep mode RACH configuration indicating light sleep mode ROs 908, and a deep sleep mode RACH configuration indicating deep sleep mode ROs 910. The base station may then monitor the indicated sleep mode ROs 1022 at block 1044 according to the sleep mode RACH configuration(s) 1028. The base station may also provide an RRC message 1030, a MAC-CE 1032, or a DCI 1034 to the UE including one or more parameters or bits indicating the sleep mode RACH configuration(s) to be applied.

In one example, the power savings mode may comprise a plurality of sleep modes of the base station, the one or more RACH configurations may include multiple sets of the ROs, each of the sleep modes being associated with one of the multiple sets of ROs, and the monitored ROs may be associated with an indicated one of the sleep modes in a radio resource control (RRC) message, a medium access control (MAC) control element (MAC-CE), or downlink control information (DCI). For instance, referring to FIG. 10, the power savings mode 1006 may include multiple sleep modes 1008 (e.g., a regular sleep mode, light sleep mode, and deep sleep mode), and the RACH configuration(s) 1010 may include multiple RO sets 1036. Here, RACH configuration(s) 1010 may be either the single RACH configuration 1014, or the power savings RACH configuration 1024 and/or sleep mode RACH configuration(s) 1028, and each set of ROs may be associated with a different one of the sleep modes 1008. The base station may also provide RRC message 1030, MAC-CE 1032, or DCI 1034 indicating one of the RO sets (e.g., sleep mode or configurations) to be applied, and the base station may monitor the indicated sleep mode ROs 1022 at block 1044 according to the set of ROs indicated in the RRC message, MAC-CE, or DCI.

At 1206, the base station obtains a wake up signal from the UE in at least one of the monitored ROs, where the wake up signal comprises a RACH message including a preamble in a physical random access channel (PRACH). For example, 1206 may be performed by wake up signal component 1444. For instance, referring to FIG. 10, while the base station 1004 is monitoring the ROs associated with the power savings mode of the base station at 1204, the base station may receive a wake up signal 1048 (e.g., RACH message 804 in FIG. 8) from the UE 1002 in one of the monitored ROs (e.g., the power savings ROs 1018 or indicated sleep mode ROs 1022 monitored at block 1046). The RACH message may be a PRACH transmission including a preamble (e.g., message 1 in a four-step RACH procedure (contention-based or contention-free) or message A in a two-step RACH procedure (contention-based or contention-free)), which the UE may transmit during initial access or as part of cell reselection, for example. In response to the wake-up signal, the base station may wake up and decode the RACH message, after which the base station may respond to the UE with a random access response in a four-step RACH procedure or message B in a two-step RACH procedure. The base station may also remain awake for a cell active time (e.g., cell active time 808 in FIG. 8) in response to receipt of the wake-up signal.

Finally, at 1208, the base station may obtain a subsequent RACH message in at least one of the other ROs not associated with the power savings mode during a cell active time of the base station. For example, 1208 may be performed by subsequent RACH message component 1446. The at least one of the other ROs may be indicated in either the single RACH configuration or the second RACH configuration sent at 1102. For instance, referring to FIG. 10, the base station 1004 may receive a subsequent RACH message 1050 from the UE 1002 in any of the configured ROs 1012 in the RACH configuration(s) 1010 which are not associated with power savings mode 1006 (e.g., power savings mode 1006 or sleep modes 1008), e.g., other ROs 1020 than power savings ROs 1018 and indicated sleep mode ROs 1022. In one example where the base station provides single RACH configuration 1014 to the UE, the base station may receive subsequent RACH message 1050 in one of the other ROs 1020 indicated in the single RACH configuration 1014. In another example where the base station provides power-savings RACH configuration 1024 (a first RACH configuration) and non-power savings RACH configuration 1026 (a second RACH configuration) to the UE, the base station may receive subsequent RACH message 1050 in one of the other ROs 1020 indicated in the non-power savings RACH configuration. In either example, the base station may receive subsequent RACH message 1050 in other ROs 1020 during the time that the base station remains awake for a cell active time (e.g., cell active time 808) in response to receiving wake-up signal 1048 from the UE at 1106. Subsequent RACH message 1050 may be a PRACH transmission including a preamble (e.g., message 1 in a four-step RACH procedure (contention-based or contention-free) or message A in a two-step RACH procedure (contention-based or contention-free)), which the UE may transmit in the event the UE loses uplink synchronization with the base station or performs beam failure recovery, for example.

Figure 13:
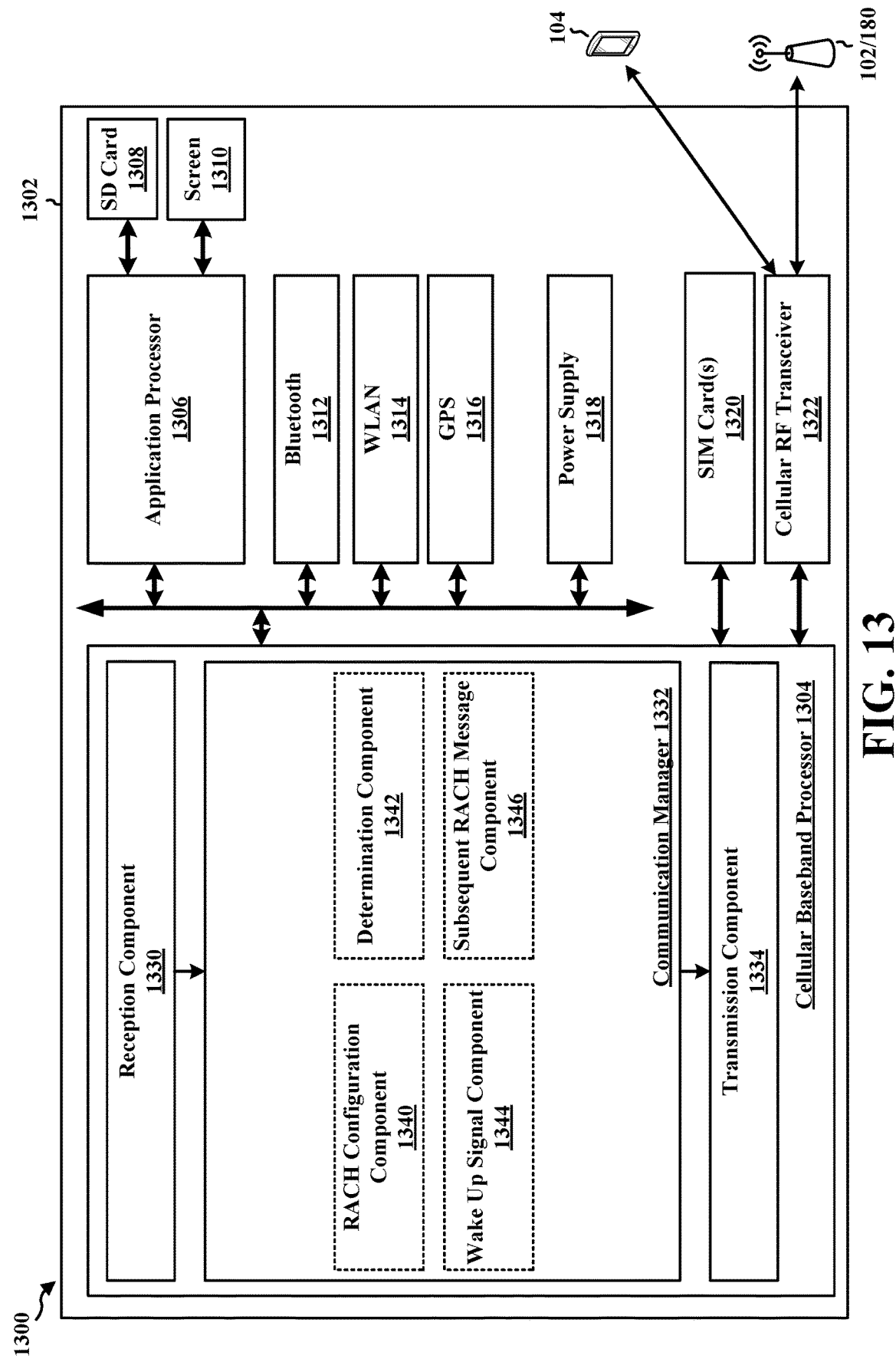
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a RACH configuration component 1340 that is configured to obtain one or more RACH configurations indicating ROs, e.g., as described in connection with 1102. The communication manager 1332 further includes a determination component 1342 that receives input in the form of the RACH configurations from the RACH configuration component 1340 and is configured to determine the ROs associated with a power savings mode of a base station, e.g., as described in connection with 1104. The communication manager 1332 further includes a wake up signal component 1344 that receives input in the form of the ROs from the determination component 1342 and is configured to send a wake up signal to the base station in at least one of the determined ROs, where the wake up signal comprises a RACH message including a preamble in a physical random access channel (PRACH), e.g., as described in connection with 1106. The communication manager 1332 further includes a subsequent RACH message component 1346 that receives input in the form of the RACH configurations from the RACH configuration component 1340 and is configured to send a subsequent RACH message in at least one of the other ROs not associated with the power savings mode during a cell active time of the base station, e.g., as described in connection with 1108.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for obtaining one or more random access channel (RACH) configurations indicating RACH occasions (ROs); means for determining the ROs associated with a power savings mode of a base station; and means for sending a wake up signal to the base station in at least one of the determined ROs, wherein the wake up signal comprises a RACH message including a preamble in a physical random access channel (PRACH).

In one configuration, the means for sending may be further configured to send a subsequent RACH message in at least one of the other ROs not associated with the power savings mode and indicated in the single RACH configuration during a cell active time of the base station.

In one configuration, the means for sending may be further configured to send a subsequent RACH message in at least one of the other ROs not associated with the power savings mode and indicated in the second RACH configuration during a cell active time of the base station.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
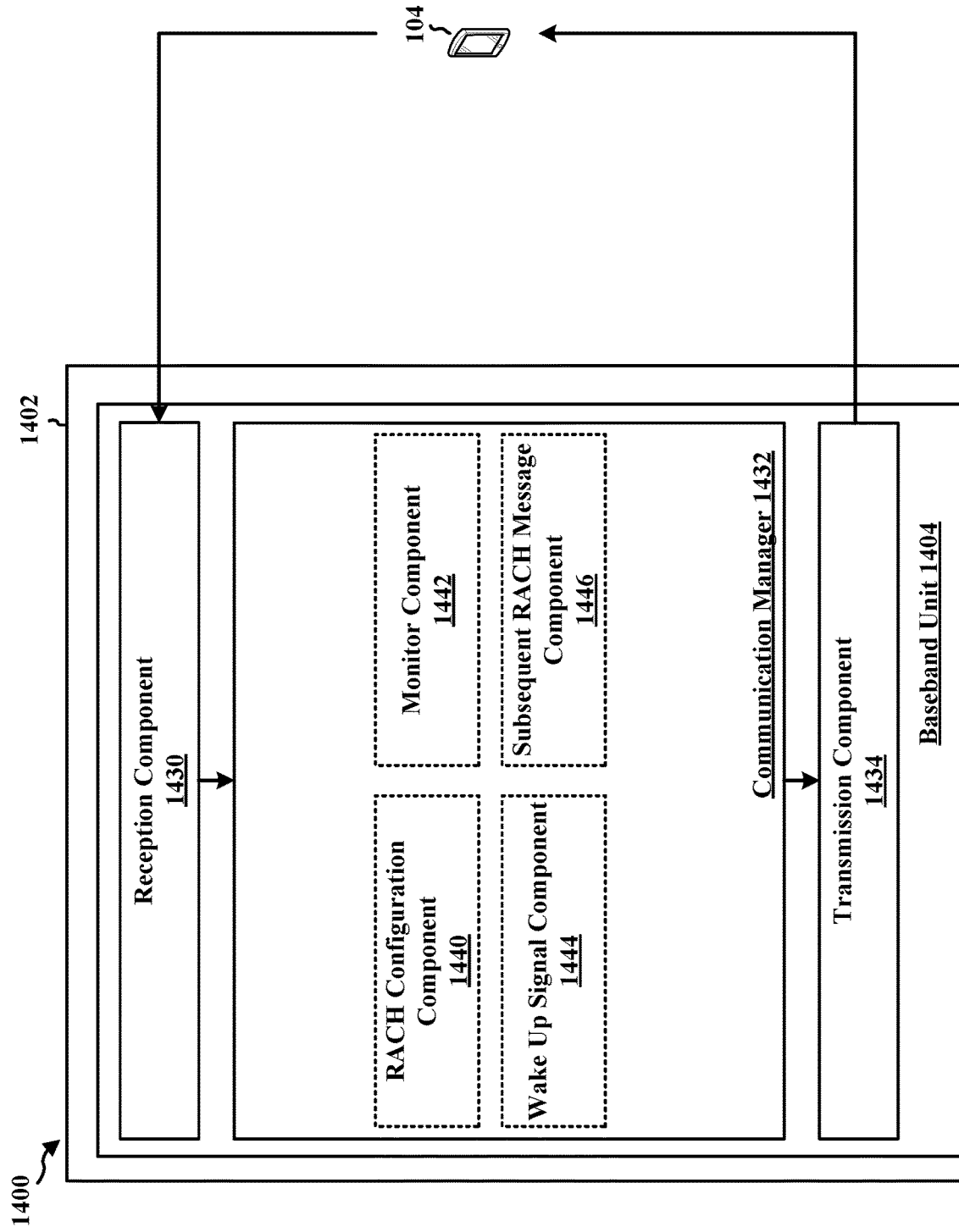
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a RACH configuration component 1440 that is configured to send one or more RACH configurations indicating ROs to a UE, e.g., as described in connection with 1202. The communication manager 1432 further includes a monitor component 1442 that receives input in the form of the RACH configurations from the RACH configuration component 1440 and is configured to monitor the ROs associated with a power savings mode of the base station, e.g., as described in connection with 1204. The communication manager 1432 further includes a wake up signal component 1444 that receives input in the form of the ROs from the monitor component 1442 and is configured to obtain a wake up signal from the UE in at least one of the monitored ROs, where the wake up signal comprises a RACH message including a preamble in a physical random access channel (PRACH), e.g., as described in connection with 1206. The communication manager 1432 further includes a subsequent RACH message component 1446 that receives input in the form of the RACH configurations from the RACH configuration component 1440 and is configured to obtain a subsequent RACH message in at least one of the other ROs not associated with the power savings mode during a cell active time of the base station, e.g., as described in connection with 1208.

The apparatus may include additional components that perform each of the blocks of the algorithm in the aforementioned flowcharts of FIGS. 10 and 12. As such, each block in the aforementioned flowcharts of FIGS. 10 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for sending one or more random access channel (RACH) configurations indicating RACH occasions (ROs) to a UE; means for monitoring the ROs associated with a power savings mode of the base station; and means for obtaining a wake up signal from the UE in at least one of the monitored ROs, wherein the wake up signal comprises a RACH message including a preamble in a physical random access channel (PRACH).

In one configuration, the means for obtaining may be further configured to obtain a subsequent RACH message in at least one of the other ROs not associated with the power savings mode and indicated in the single RACH configuration during a cell active time of the base station.

In one configuration, the means for obtaining may be further configured to obtain a subsequent RACH message in at least one of the other ROs not associated with the power savings mode and indicated in the second RACH configuration during a cell active time of the base station.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow a base station to provide RACH configuration(s) indicating RACH occasions which correspond to wake up occasions of a base station according to a power savings mode or sleep operation mode of the base station. For instance, the base station may send one or more RACH configurations indicating ROs to a UE, and then monitor the ROs associated with the power savings mode. The UE may then determine the ROs associated with the power savings mode, and send a wake up signal to the base station in at least one of the determined ROs. The base station may obtain the wake up signal from the UE in at least one of the monitored ROs. Here, the wake up signal comprises a RACH message. As a result, network power consumption may be optimized through designed configurations which allow a UE to wake up a sleeping base station via a RACH message.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: obtaining one or more random access channel (RACH) configurations indicating RACH occasions (ROs); determining the ROs associated with a power savings mode of a base station; and sending a wake up signal to the base station in at least one of the determined ROs, wherein the wake up signal comprises a RACH message including a preamble in a physical random access channel (PRACH).

Example 2 is the method of Example 1, wherein the one or more RACH configurations comprise a single RACH configuration indicating the ROs associated with the power savings mode and other ROs not associated with the power savings mode.

Example 3 is the method of Example 2, wherein the single RACH configuration includes a mask indicating the ROs associated with the power savings mode.

Example 4 is the method of Examples 2 or 3, wherein the power savings mode comprises a plurality of sleep modes of the base station, the single RACH configuration indicates one of the sleep modes, and the determined ROs are associated with the indicated one of the sleep modes.

Example 5 is the method of Example 4, wherein the single RACH configuration includes a mask indicating the ROs associated with the indicated one of the sleep modes.

Example 6 is the method of any of Examples 2 to 5, further comprising: sending a subsequent RACH message in at least one of the other ROs not associated with the power savings mode and indicated in the single RACH configuration during a cell active time of the base station.

Example 7 is the method of Example 1, wherein the one or more RACH configurations comprise a first RACH configuration indicating the ROs associated with the power savings mode and a second RACH configuration indicating other ROs not associated with the power savings mode.

Example 8 is the method of Example 7, wherein the power savings mode comprises a plurality of sleep modes of the base station, the one or more RACH configurations further comprise a third RACH configuration for one of the sleep modes, and the determined ROs are associated with the third RACH configuration.

Example 9 is the method of Examples 7 or 8, further comprising: sending a subsequent RACH message in at least one of the other ROs not associated with the power savings mode and indicated in the second RACH configuration during a cell active time of the base station.

Example 10 is the method of Example 1, wherein the power savings mode comprises a plurality of sleep modes of the base station, the one or more RACH configurations include multiple sets of the ROs, each of the sleep modes being associated with one of the multiple sets of ROs, and the determined ROs are associated with an indicated one of the sleep modes in a radio resource control (RRC) message, a medium access control (MAC) control element (MAC-CE), or downlink control information (DCI).

Example 11 is an apparatus for wireless communication, comprising: a processor; memory coupled with the processor; and instructions stored in the memory and operable, when executed by the processor, to cause the apparatus to: obtain one or more random access channel (RACH) configurations indicating RACH occasions (ROs); determine the ROs associated with a power savings mode of a base station; and send a wake up signal to the base station in at least one of the determined ROs, wherein the wake up signal comprises a RACH message including a preamble in a physical random access channel (PRACH).

Example 12 is the apparatus of Example 11, wherein the one or more RACH configurations comprise a single RACH configuration indicating the ROs associated with the power savings mode and other ROs not associated with the power savings mode.

Example 13 is the apparatus of Example 12, wherein the instructions, when executed by the processor, further cause the apparatus to: send a subsequent RACH message in at least one of the other ROs not associated with the power savings mode and indicated in the single RACH configuration during a cell active time of the base station.

Example 14 is the apparatus of Example 11, wherein the one or more RACH configurations comprise a first RACH configuration indicating the ROs associated with the power savings mode and a second RACH configuration indicating other ROs not associated with the power savings mode.

Example 15 is the apparatus of Example 14, wherein the instructions, when executed by the processor, further cause the apparatus to: send a subsequent RACH message in at least one of the other ROs not associated with the power savings mode and indicated in the second RACH configuration during a cell active time of the base station.

Example 16 is a method of wireless communication at a base station, comprising: sending one or more random access channel (RACH) configurations indicating RACH occasions (ROs) to a user equipment (UE); monitoring the ROs associated with a power savings mode of the base station; and obtaining a wake up signal from the UE in at least one of the monitored ROs, wherein the wake up signal comprises a RACH message including a preamble in a physical random access channel (PRACH).

Example 17 is the method of Example 16, wherein the one or more RACH configurations comprise a single RACH configuration indicating the ROs associated with the power savings mode and other ROs not associated with the power savings mode.

Example 18 is the method of Example 17, wherein the single RACH configuration includes a mask indicating the ROs associated with the power savings mode.

Example 19 is the method of Examples 17 or 18, wherein the power savings mode comprises a plurality of sleep modes of the base station, the single RACH configuration indicates one of the sleep modes, and the monitored ROs are associated with the indicated one of the sleep modes.

Example 20 is the method of Example 19, wherein the single RACH configuration includes a mask indicating the ROs associated with the indicated one of the sleep modes.

Example 21 is the method of any of Examples 17 to 20, further comprising: obtaining a subsequent RACH message in at least one of the other ROs not associated with the power savings mode and indicated in the single RACH configuration during a cell active time of the base station.

Example 22 is the method of Example 16, wherein the one or more RACH configurations comprise a first RACH configuration indicating the ROs associated with the power savings mode and a second RACH configuration indicating other ROs not associated with the power savings mode.

Example 23 is the method of Example 22, wherein the power savings mode comprises a plurality of sleep modes of the base station, the one or more RACH configurations further comprise a third RACH configuration for one of the sleep modes, and the monitored ROs are associated with the third RACH configuration.

Example 24 is the method of Examples 22 or 23, further comprising: obtaining a subsequent RACH message in at least one of the other ROs not associated with the power savings mode and indicated in the second RACH configuration during a cell active time of the base station.

Example 25 is the method of Example 16, wherein the power savings mode comprises a plurality of sleep modes of the base station, the one or more RACH configurations include multiple sets of the ROs, each of the sleep modes being associated with one of the multiple sets of ROs, and the monitored ROs are associated with an indicated one of the sleep modes in a radio resource control (RRC) message, a medium access control (MAC) control element (MAC-CE), or downlink control information (DCI).

Example 26 is an apparatus for wireless communication, comprising: a processor; memory coupled with the processor; and instructions stored in the memory and operable, when executed by the processor, to cause the apparatus to:

send one or more random access channel (RACH) configurations indicating RACH occasions (ROs) to a user equipment (UE); monitor the ROs associated with a power savings mode of the apparatus; and obtain a wake up signal from the UE in at least one of the monitored ROs, wherein the wake up signal comprises a RACH message including a preamble in a physical random access channel (PRACH).

Example 27 is the apparatus of Example 26, wherein the one or more RACH configurations comprise a single RACH configuration indicating the ROs associated with the power savings mode and other ROs not associated with the power savings mode.

Example 28 is the apparatus of Example 27, wherein the instructions, when executed by the processor, further cause the apparatus to: obtain a subsequent RACH message in at least one of the other ROs not associated with the power savings mode and indicated in the single RACH configuration during a cell active time of the apparatus.

Example 29 is the apparatus of Example 26, wherein the one or more RACH configurations comprise a first RACH configuration indicating the ROs associated with the power savings mode and a second RACH configuration indicating other ROs not associated with the power savings mode.

Example 30 is the apparatus of Example 29, wherein the instructions, when executed by the processor, further cause the apparatus to: obtain a subsequent RACH message in at least one of the other ROs not associated with the power savings mode and indicated in the second RACH configuration during a cell active time of the apparatus.

What is claimed is:

1. A method of wireless communication at a user equipment (UE), comprising:
    obtaining, in a system information block (SIB1), one or more random access channel (RACH) configurations indicating RACH occasions (ROs);
    determining the ROs associated with a power savings mode of a base station; and
    sending a wake up signal to the base station in at least one of the determined ROs, wherein the wake up signal comprises a RACH message including a preamble in a physical random access channel (PRACH);
    wherein the one or more RACH configurations in the SIB1 comprise:
        a single RACH configuration indicating the ROs associated with the power savings mode and other ROs not associated with the power savings mode,
        a first RACH configuration indicating the ROs associated with the power savings mode and a second RACH configuration indicating the other ROs not associated with the power savings mode, or
        multiple sets of the ROs, wherein the power savings mode comprises a plurality of sleep modes of the base station, each of the sleep modes being associated with one of the multiple sets of the ROs, and the determined ROs are associated with an indicated one of the sleep modes in a radio resource control (RRC) message, a medium access control (MAC) control element (MAC-CE), or downlink control information (DCI).

2. The method of claim 1, wherein the one or more RACH configurations comprise the single RACH configuration.

3. The method of claim 2, wherein the single RACH configuration includes a mask indicating the ROs associated with the power savings mode.

4. The method of claim 2, wherein the power savings mode comprises a plurality of sleep modes of the base station, the single RACH configuration indicates one of the sleep modes, and the determined ROs are associated with the indicated one of the sleep modes.

5. The method of claim 4, wherein the single RACH configuration includes a mask indicating the ROs associated with the indicated one of the sleep modes.

6. The method of claim 2, further comprising:
    sending a subsequent RACH message in at least one of the other ROs not associated with the power savings mode and indicated in the single RACH configuration during a cell active time of the base station.

7. The method of claim 1, wherein the one or more RACH configurations comprise the first RACH configuration and the second RACH configuration.

8. The method of claim 7, wherein the power savings mode comprises a plurality of sleep modes of the base station, the one or more RACH configurations further comprise a third RACH configuration for one of the sleep modes, and the determined ROs are associated with the third RACH configuration.

9. The method of claim 7, further comprising:
    sending a subsequent RACH message in at least one of the other ROs not associated with the power savings mode and indicated in the second RACH configuration during a cell active time of the base station.

10. The method of claim 1, wherein the power savings mode comprises the plurality of sleep modes of the base station, the one or more RACH configurations include the multiple sets of the ROs, each of the sleep modes being associated with the one of the multiple sets of the ROs, and the determined ROs are associated with the indicated one of the sleep modes in the radio resource control (RRC) message, the medium access control (MAC) control element (MAC-CE), or the downlink control information (DCI).

11. An apparatus for wireless communication, comprising:
    one or more processors;
    one or more memories each coupled with at least one of the one or more processors; and
    instructions stored in the one or more memories and operable, when executed by the one or more processors individually or in combination, to cause the apparatus to:
        obtain, in a system information block (SIB1), one or more random access channel (RACH) configurations indicating RACH occasions (ROs);
        determine the ROs associated with a power savings mode of a base station; and
        send a wake up signal to the base station in at least one of the determined ROs, wherein the wake up signal comprises a RACH message including a preamble in a physical random access channel (PRACH);
    wherein the one or more RACH configurations in the SIB1 comprise:
        a single RACH configuration indicating the ROs associated with the power savings mode and other ROs not associated with the power savings mode,
        a first RACH configuration indicating the ROs associated with the power savings mode and a second RACH configuration indicating the other ROs not associated with the power savings mode, or
        multiple sets of the ROs, wherein the power savings mode comprises a plurality of sleep modes of the base station, each of the sleep modes being associated with one of the multiple sets of the ROs, and the determined ROs are associated with an indicated one of the sleep modes in a radio resource control (RRC) message, a medium access control (MAC) control element (MAC-CE), or downlink control information (DCI).

12. The apparatus of claim 11, wherein the one or more RACH configurations comprise the single RACH configuration.

13. The apparatus of claim 12, wherein the instructions, when executed by the one or more processors individually or in combination, further cause the apparatus to:
send a subsequent RACH message in at least one of the other ROs not associated with the power savings mode and indicated in the single RACH configuration during a cell active time of the base station.

14. The apparatus of claim 11, wherein the one or more RACH configurations comprise the first RACH configuration and the second RACH configuration.

15. The apparatus of claim 14, wherein the instructions, when executed by the one or more processors individually or in combination, further cause the apparatus to:
send a subsequent RACH message in at least one of the other ROs not associated with the power savings mode and indicated in the second RACH configuration during a cell active time of the base station.

16. A method of wireless communication at a base station, comprising:
sending, in a system information block (SIB1), one or more random access channel (RACH) configurations indicating RACH occasions (ROs) to a user equipment (UE);
monitoring the ROs associated with a power savings mode of the base station; and
obtaining a wake up signal from the UE in at least one of the monitored ROs, wherein the wake up signal comprises a RACH message including a preamble in a physical random access channel (PRACH);
wherein the one or more RACH configurations in the SIB1 comprise:
a single RACH configuration indicating the ROs associated with the power savings mode and other ROs not associated with the power savings mode,
a first RACH configuration indicating the ROs associated with the power savings mode and a second RACH configuration indicating the other ROs not associated with the power savings mode, or
multiple sets of the ROs, wherein the power savings mode comprises a plurality of sleep modes of the base station, each of the sleep modes being associated with one of the multiple sets of the ROs, and the monitored ROs are associated with an indicated one of the sleep modes in a radio resource control (RRC) message, a medium access control (MAC) control element (MAC-CE), or downlink control information (DCI).

17. The method of claim 16, wherein the one or more RACH configurations comprise the single RACH configuration.

18. The method of claim 17, wherein the single RACH configuration includes a mask indicating the ROs associated with the power savings mode.

19. The method of claim 17, wherein the power savings mode comprises a plurality of sleep modes of the base station, the single RACH configuration indicates one of the sleep modes, and the monitored ROs are associated with the indicated one of the sleep modes.

20. The method of claim 19, wherein the single RACH configuration includes a mask indicating the ROs associated with the indicated one of the sleep modes.

21. The method of claim 17, further comprising:
obtaining a subsequent RACH message in at least one of the other ROs not associated with the power savings mode and indicated in the single RACH configuration during a cell active time of the base station.

22. The method of claim 16, wherein the one or more RACH configurations comprise the first RACH configuration and the second RACH configuration.

23. The method of claim 22, wherein the power savings mode comprises a plurality of sleep modes of the base station, the one or more RACH configurations further comprise a third RACH configuration for one of the sleep modes, and the monitored ROs are associated with the third RACH configuration.

24. The method of claim 22, further comprising:
obtaining a subsequent RACH message in at least one of the other ROs not associated with the power savings mode and indicated in the second RACH configuration during a cell active time of the base station.

25. The method of claim 16, wherein the power savings mode comprises the plurality of sleep modes of the base station, the one or more RACH configurations include the multiple sets of the ROs, each of the sleep modes being associated with the one of the multiple sets of the ROs, and the monitored ROs are associated with the indicated one of the sleep modes in the radio resource control (RRC) message, the medium access control (MAC) control element (MAC-CE), or the downlink control information (DCI).

26. An apparatus for wireless communication, comprising:
one or more processors;
one or more memories each coupled with at least one of the one or more processors; and
instructions stored in the one or more memories and operable, when executed by the one or more processors individually or in combination, to cause the apparatus to:
send, in a system information block (SIB1), one or more random access channel (RACH) configurations indicating RACH occasions (ROs) to a user equipment (UE);
monitor the ROs associated with a power savings mode of the apparatus; and
obtain a wake up signal from the UE in at least one of the monitored ROs, wherein the wake up signal comprises a RACH message including a preamble in a physical random access channel (PRACH);
wherein the one or more RACH configurations in the SIB1 comprise:
a single RACH configuration indicating the ROs associated with the power savings mode and other ROs not associated with the power savings mode,
a first RACH configuration indicating the ROs associated with the power savings mode and a second RACH configuration indicating the other ROs not associated with the power savings mode, or
multiple sets of the ROs, wherein the power savings mode comprises a plurality of sleep modes of the apparatus, each of the sleep modes being associated with one of the multiple sets of the ROs, and the monitored ROs are associated with an indicated one of the sleep modes in a radio resource control (RRC) message, a medium access control (MAC) control element (MAC-CE), or downlink control information (DCI).

27. The apparatus of claim 26, wherein the one or more RACH configurations comprise the single RACH configuration.

28. The apparatus of claim 27, wherein the instructions, when executed by the one or more processors individually or in combination, further cause the apparatus to:
  obtain a subsequent RACH message in at least one of the other ROs not associated with the power savings mode and indicated in the single RACH configuration during a cell active time of the apparatus.

29. The apparatus of claim 26, wherein the one or more RACH configurations comprise the first RACH configuration and the second RACH configuration.

30. The apparatus of claim 29, wherein the instructions, when executed by the one or more processors individually or in combination, further cause the apparatus to:
  obtain a subsequent RACH message in at least one of the other ROs not associated with the power savings mode and indicated in the second RACH configuration during a cell active time of the apparatus.

* * * * *